US012099989B2

(12) United States Patent
Jo

(10) Patent No.: US 12,099,989 B2
(45) Date of Patent: Sep. 24, 2024

(54) ON-BOARD UNIT ABLE TO WORK IN CONCERT WITH IN-VEHICLE HEAD UNIT, VEHICLE SYSTEM INCLUDING SAME, AND METHOD OF UPDATING SAME

(71) Applicant: HYUNDAI MOBIS CO., LTD., Seoul (KR)

(72) Inventor: Jang Hyeon Jo, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/930,023

(22) Filed: Sep. 6, 2022

(65) Prior Publication Data

US 2023/0080585 A1 Mar. 16, 2023

(30) Foreign Application Priority Data

Sep. 6, 2021 (KR) ........................ 10-2021-0118662

(51) Int. Cl.
*G06Q 20/32* (2012.01)

(52) U.S. Cl.
CPC ....... *G06Q 20/327* (2013.01); *G06Q 2240/00* (2013.01)

(58) Field of Classification Search
CPC ...... G06Q 50/30; G06Q 10/00; G06Q 10/025; G06Q 2240/00; G07B 15/00; G07B 15/063
USPC .......................................................... 705/13
See application file for complete search history.

(56) References Cited

U.S. PATENT DOCUMENTS

| 6,233,519 | B1 * | 5/2001 | Yamada | G01C 21/28 701/487 |
| 6,704,646 | B2 * | 3/2004 | Cochlovius | G01C 21/3667 701/461 |
| 2010/0076878 | A1 * | 3/2010 | Burr | G06Q 30/04 701/123 |
| 2017/0113619 | A1 * | 4/2017 | Boehm | G07B 15/06 |
| 2017/0364719 | A1 * | 12/2017 | Boehm | G07B 15/063 |
| 2018/0224286 | A1 * | 8/2018 | Pickering | G01C 21/3611 |

FOREIGN PATENT DOCUMENTS

| CN | 111260804 A | * | 6/2020 | |
| CN | 112017311 A | * | 12/2020 | |
| CN | 113283566 A | * | 8/2021 | |
| CN | 113313845 A | * | 8/2021 | G07B 15/06 |

(Continued)

OTHER PUBLICATIONS

"What Are the In-Vehicle Communciation Equipment in the Connected Cars Ecosystem?" by Echo Liu, Jul. 31, 2020 (Year: 2020).*

(Continued)

*Primary Examiner* — Omar Zeroual
*Assistant Examiner* — Brian Adams Heflin
(74) *Attorney, Agent, or Firm* — DLA Piper LLP US

(57) ABSTRACT

An on board unit (OBU) updatable by working in concert with an in-vehicle head unit. A controller area network (CAN) circuit part transmits and receives data to and from the head unit on basis of CAN communication. An electronic toll collection system (ETCS) circuit part executes update target data received from the head unit and updates a control program as a result of the execution of the update target data.

12 Claims, 22 Drawing Sheets

(56) References Cited

FOREIGN PATENT DOCUMENTS

| | | | | |
|---|---|---|---|---|
| CN | 113794614 A | * | 12/2021 | |
| JP | 2002123846 A | * | 4/2002 | |
| KR | 2009-0098064 | | 9/2009 | |
| KR | 2010-0079496 | | 7/2010 | |
| KR | 20220138697 A | * | 10/2022 | |

OTHER PUBLICATIONS

English Language Abstract of KR 2009-0098064 published Sep. 17, 2009.
English Language Abstract of KR 2010-0079496 published Jul. 8, 2010.

* cited by examiner

ON-BOARD UNIT ABLE TO WORK IN CONCERT WITH IN-VEHICLE HEAD UNIT, VEHICLE SYSTEM INCLUDING SAME, AND METHOD OF UPDATING SAME

CROSS-REFERENCE TO RELATED APPLICATION

This application claims priority to and the benefit of Korean Patent Application No. 10-2021-0118662, filed on Sep. 6, 2021, the disclosure of which is incorporated herein by reference in its entirety.

BACKGROUND

Technical Field

The present disclosure relates to an on-board unit able to work in concert with an in-vehicle head unit, a vehicle system including same, and a method of updating the same.

Related Art

Recently, toll roads including highways may be provided with an electronic toll collection system (ETCS) for smooth flow of traffic. In general, an ETCS is an automatic ETCS that automatically charges traveling vehicles with highway tolls via wireless communications. Such an ETCS commonly includes electronic cards, on-board units (OBUs), and road-side equipment (RSE). When the RSE recognizes a vehicle and sends payment request information to an OBU, the OBU reads payment information of an electronic card and sends the payment information to the RSE. The RSE completes payment using the payment information of the electronic card.

The RSE is provided with one or two antennas for transmitting and receiving data to and from the OBU, and the antennas determine the radius of communication of the RSE.

Recently, in response to the development of in-vehicle infotainment, persons in a vehicle may be provided not only with various types of convenience information through a multimedia system (e.g., an H/unit or a display dedicated device), but also with cutting edge entertainment services, such as movies and music. Thus, there is demand for the development of a technology capable of transmitting various types of ETCS information through joint operation of the head unit and the OBU and updating the OBU.

Furthermore, in recently launched new vehicles, a vehicle navigation system is additionally provided with various types of payment functions, so that a driver may use services and make payments in a gas station, a parking lot, drive-through facilities, etc. without using a credit card. There is demand for a specific solution enabling an electronic card in the OBU to pay a charge using a payment means of such a vehicle payment system.

SUMMARY

Various embodiments are directed to an on-board unit (OBU) able to work in concert with an in-vehicle head unit and a method of operating the OBU in concert with the in-vehicle head unit so as to provide various types of electronic toll collection system (ETCS) information using a display device such as a navigation system.

Various embodiments are also directed to an OBU able to work in concert with an in-vehicle head unit, a vehicle system including the same, and a method of updating the same, wherein the OBU may easily update a control program through controller area network (CAN) communication by working in concert with a head unit.

Various embodiments are also directed to an OBU using a vehicle payment system of an in-vehicle head unit and a charge payment method using an electronic card, wherein an electronic card charge of the OBU may be paid using a payment means of the vehicle payment system.

Various embodiments are also directed to an OBU-embedded overhead console, wherein the emotional quality of a rearview mirror may be improved and the field of view of the rearview mirror may be increased by moving an OBU or a speaker, which has conventionally been embedded in the rearview mirror, to the overhead console.

The objective of the present disclosure is not limited to the aforementioned description, and other objectives not explicitly disclosed herein will be clearly understood by a person having ordinary skill in the art from the description provided hereinafter.

According to a first aspect for overcoming at least one of the above objectives, provided is an on board unit (OBU) updatable by working in concert with an in-vehicle head unit. The OBU may include: a controller area network (CAN) circuit part transmitting and receiving data to and from the head unit on basis of CAN communication; and an electronic toll collection system (ETCS) circuit part executing update target data received from the head unit and updating a control program as a result of the execution of the update target data.

Also provided is a method of updating an OBU able to work in concert with an in-vehicle head unit. The method may include: receiving update target data from the head unit on basis of CAN communication; executing the update target data; and updating a control program as a result of the execution of the update target data.

Also provided is a vehicle system including: a head unit; and an OBU able to update a control program by working in concert with the head unit. When update target data is received from an external server, the head unit may store the update target data in an internal memory, read the stored update target data, and transmit the update target data to the OBU through a CAN communication part. The OBU may execute the update target data received from the head unit and update the control program as a result of the execution of the update target data.

According to another aspect for overcoming at least one of the above objectives, provided is a computer program combined with a computer, i.e., a piece of hardware, to execute a method of updating an OBU able to work in concert with an in-vehicle head unit. The computer program may be stored in a computer readable recording medium.

Other specific features of the present disclosure are included in the Detailed Description section and the Drawings.

According to embodiments of the present disclosure, joint operation of the OBU and the head unit make it possible to advantageously provide various types of ETCS-related information and additional service information to a user through a variety of information providing devices connected to the head unit.

In addition, the ETCS information which has been restrictively provided through a conventional speaker dedicated for an OBU can be provided in the form of ETCS voice guidance, thereby improving emotional quality. In addition, the ETCS information can be advantageously output through a variety of display devices, such as a navigation system, a head-up display (HUD), and a cluster.

In addition, there is an advantage in that a driver is not required to visit a vehicle service station in order to update the OBU, and the vehicle service station is also not required to be provided with separate devices for updating the OBU.

Furthermore, since the OBU can be updated through working in concert with the head unit, an operation of fastening an update terminal connector is unnecessary. In some cases, costs can be reduced by removing the update terminal, and the update can be easily performed by simply operating the navigation system.

In addition, since the OBU is not provided with a socket into which an electronic card is to be inserted, it is possible to design the OBU to have a slim profile and reduce costs. It is also possible to advantageously reduce a recognition error ratio caused by non-insertion of the electronic card. In addition, the driver is not required to newly purchase an electronic card or insert the electronic card into a socket. It is possible to advantageously pay an ETCS charge in a convenient manner using a payment means of a vehicle payment system. When vehicle sharing services are expanded as a part of mobility services in the future, the convenience of the ETCS payment using the vehicle payment system can be improved.

In addition, when an electronic card is used, it is possible to improve the design and functions of a rearview mirror while maintaining convenience in the insertion and withdrawal of the electronic card and the operation of buttons.

Furthermore, when the OBU works in concert with the head unit, the OBU and the head unit can be properly connected without interference with another part in assembly or structural limitations.

The effects of the present disclosure are not limited to the aforementioned description, and other effects not explicitly disclosed herein will be clearly understood by a person having ordinary skill in the art from the description provided hereinafter.

DETAILED DESCRIPTION

Figure 1:
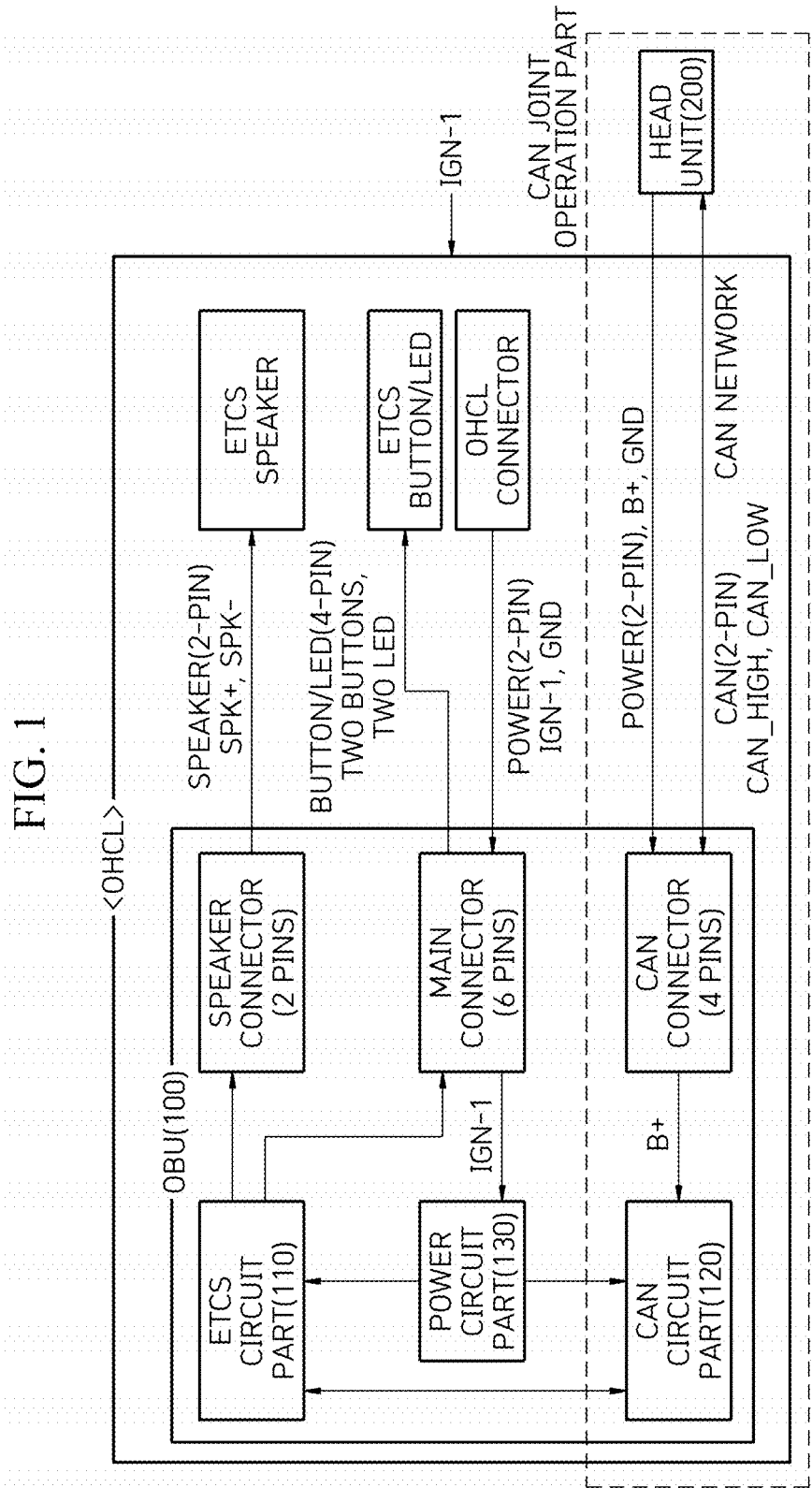
FIG. 1 is a block diagram illustrating an OBU according to embodiments of the present disclosure.

The above and other advantages and features of the present disclosure, as well as methods of realizing the same, will be more clearly understood from the following detailed description of embodiments when taken in conjunction with the accompanying drawings. However, the present disclosure is not limited to specific embodiments to be described hereinafter but may be embodied in a variety of different forms. Rather, these embodiments are provided so that the description of the present disclosure will be complete and will fully convey the scope of the present disclosure to those skilled in the technical field to which the present disclosure pertains. The present disclosure shall be defined by the scope of the Claims.

The terminologies used herein are for the purpose of describing particular embodiments only and are not intended to limit the present disclosure. As used herein, singular forms are intended to include plural forms as well, unless the context clearly indicates otherwise. It will be further understood that the terms "comprise," "include," "have," etc. when used in this specification, specify the presence of stated features, integers, steps, operations, elements, components, and/or combinations thereof but do not preclude the presence or addition of one or more other features, integers, steps, operations, elements, components, and/or combinations thereof. Throughout the specification, the same reference numerals will refer to the same or like parts. The expression "and/or" includes any combination of each or at least one of the plurality of mentioned items. It will be understood that, although the terms "first," "second," etc. may be used herein to describe various elements, these elements should not be limited by these terms. The terms are only used to distinguish one element from other elements. Thus, a first element to be described later may be referred to as a second element without departing from the technical concept of the present disclosure.

Unless otherwise defined, all terms (including technical and scientific terms) used herein may be used as having the same meaning as that which would be commonly understood by one of ordinary skill in the art to which the present disclosure belongs. In addition, it will be further understood that terms, such as those defined in commonly used dictionaries will not be interpreted in an idealized or overly formal sense unless expressly so defined herein.

Hereinafter, an on-board unit (OBU) 100 able to work in concert with an in-vehicle head unit according to embodiments of the present disclosure will be described with reference to FIGS. 1 to 5.

FIG. 1 is a block diagram illustrating an OBU 100 according to embodiments of the present disclosure.

The OBU 100 is configured to be disposed inside a vehicle (e.g., an automobile) moving on a road on which road-side equipment (RSE) is disposed or mounted on the roof of the vehicle. Thus, the OBU 100 may transmit and receive data to and from the RSE while being carried in the vehicle.

The range of communication between the OBU 100 and the RSE may be determined by dedicated short-range communications (DSRC) that are short-distance dedicated communication bands, but is not limited thereto. For example, a variety of other next-generation frequency bands, such as a wireless access in vehicular environments (WAVE) frequency, may also be included.

In addition, communication processing with respect to the RSE may mean a series of procedures of, for example, transmitting and receiving request and response signals to and from the RSE.

The RSE is disposed on the side of a road (e.g., a highway) through which vehicles move, and communicates with OBUs 100 of vehicles that have entered the coverage area of the RSE.

In the related art, it has been impossible to provide a plurality of pieces of ETCS related information in a single OBU stand-alone method, and simple voice guidance has been provided in a limited manner. Thus, there should be limitations in the provision of information. In particular, there is a drawback in that some limited information may only be provided through an OBU-dedicated speaker instead of through a vehicle speaker.

Even in the case that there are products providing a combination of functions of the navigation system and the Hi-pass system in some after markets, such products may only have a simple function and may thus have limited ability to provide various types of ETCS information.

In order to overcome these problems, embodiments of the present disclosure may provide the OBU 100 able to provide various types of ETCS-related information by working in concert with a head unit 200, in particular, a navigation system of the head unit 200, through in-vehicle CAN communication.

Referring to FIG. 1, the OBU 100 according to embodiments of the present disclosure includes an ETCS circuit part 110, a CAN circuit part 120, and a power circuit part 130.

The CAN circuit part 120 transmits and receives data to and from the head unit 200 on the basis of the CAN communication.

The ETCS circuit part generates predetermined pieces of ETCS information, and performs a control operation to transmit at least one piece of ETCS information, among the generated pieces of ETCS information, to the head unit 200 through the CAN circuit part 120, wherein the at least one piece of ETCS information is supposed to be displayed on a display device of the head unit 200.

In an embodiment, the in-vehicle display device may be a navigation system, but is not limited thereto. The display device may be any interface, such as a driver's dashboard, which may display information on a predetermined portion thereof.

The power circuit part 130 supplies power to the CAN circuit part 120 and the ETCS circuit part 110.

In an embodiment, the ETCS information generated and provided by the ETCS circuit part 110 may include information regarding the OBU 100, electronic card information regarding an electronic card inserted into the OBU 100 or stored in the OBU 100, or communication result information regarding the result of communication with the RSE.

Here, in the present disclosure, a card (e.g., a Hi-pass card) for paying a charge during passing by the RSE will be referred to as an "electronic card," whereas a card, an account, etc. used in a vehicle payment system to pay for products will be referred to as a "payment means" so as to be discriminated from the electronic card.

For example, information regarding the OBU 100 may include a serial number, an issue number, a vehicle type, a vehicle number, an issuance date, an expiration date, information regarding a software version, and information regarding a hardware version. The information regarding the OBU 100 may also include information regarding a volume level and information regarding the fastened state of antennas.

For example, the electronic card information may include state information of the electronic card, type information of the electronic card, and transaction history information of the electronic card. The state information may include information regarding normal insertion of a card, non-insertion of a card, insertion of a defective card, insufficient funds, etc. The type information may include information regarding a prepaid card, a postpaid card, a discount prepaid card, an exemption card, an automatic recharge card, etc. The transaction history information may include information regarding an entrance tollbooth, an exit tollbooth, a transaction time, an amount of payment, a card balance, etc.

The communication result information may include information regarding normal communication, abnormal communication, etc. The normal communication information may include information regarding a tollbooth type (e.g., an entrance or an exit of a closed toll collection system, an open toll system, etc.), an amount of payment, a card balance, etc. The abnormal communication information includes information regarding a payment failure when passing through a tollbooth in a normal state, non-reception of a receipt, a media access control (MAC) authentication error, etc. The abnormal communication information may also include information regarding non-insertion of a card, erroneous insertion of a card, a defective card, non-response of a card, an insufficient fund for an amount of a transaction, an excess of a transaction limit, etc.

In an embodiment, the OBU 100 according to embodiments of the present disclosure may provide toll information cumulatively calculated for a predetermined period.

That is, the ETCS circuit part 110 may periodically receive time information from the head unit 200, calculate a toll accumulated for the predetermined time using the head unit 200, and store the calculated toll therein. In addition, after a predetermined period of time, the ETCS circuit part 110 may provide the calculated toll to the head unit 200.

FIGS. 2A to 2F are diagrams illustrating a process of providing information regarding a toll calculated cumulatively.

Figure 2A:
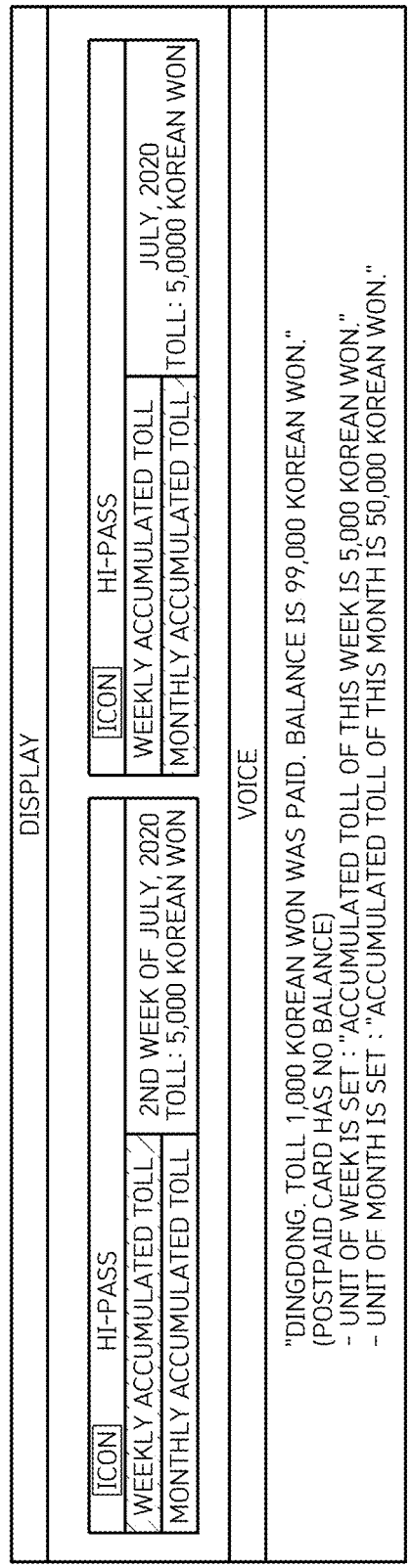
FIGS. 2A to 2F are diagrams illustrating a process of providing information regarding a toll calculated cumulatively.

Referring to FIG. 2A, the ETCS circuit part 110 may calculate a toll accumulated for a predetermined period, e.g., in units of weeks or in units of months, and provide the calculated toll to the head unit 200 at the elapse of the predetermined period, so that the user may review the corresponding information.

For example, at the elapse of the second week of July, 2020, the ETCS circuit part 110 may cumulatively calculate a toll for the second week and transfer the toll to the head unit 200 so that 5,000 Korean won is provided as the toll in voice or visually on the display device. In addition, at the elapse of July, 2020, the ETCS circuit part 110 may cumulatively calculate a toll for one month and transfer the toll to the head unit 200 so that 9,000 Korean won is provided as the toll in voice or on the display device.

Figure 2B:
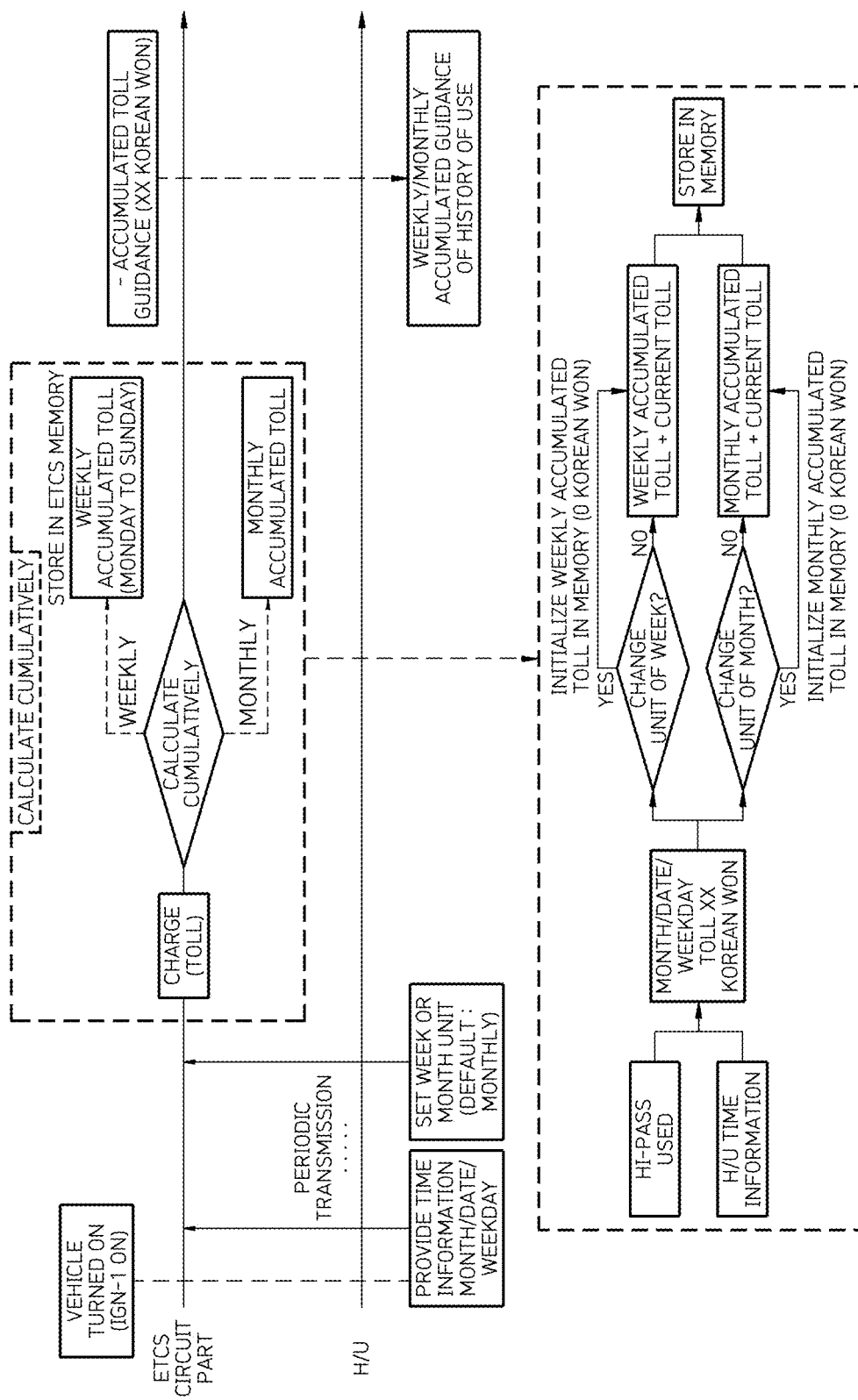

Referring to FIG. 2B, when power is applied to the ETCS circuit part 110 as the vehicle is turned on, the ETCS circuit part 110 periodically receives time information (e.g., month, date, and weekday) from the head unit 200. In addition, the ETCS circuit part 110 receives a time unit (e.g., a unit of week or a unit of month) set by a user or as a default when the vehicle is shipped.

Afterwards, as tolls (e.g., charges) are produced, the ETCS circuit part 110 accumulates tolls in units of weeks and in units of months and stores the tolls in a memory. In addition, the ETCS circuit part 110 may cumulatively calculate the stored tolls and provide the calculated toll to the head unit 200, and the head unit 200 may provide toll information to the user in units of weeks or in units of months.

In addition, when the setting of the predetermined period is changed, the ETCS circuit part 110 may initialize the toll information cumulatively stored in the memory. For example, when the setting is changed in units of weeks, the toll information that has been cumulatively stored is initialized. When a toll corresponding to the changed period is produced, the corresponding toll may be newly stored in a cumulative manner.

Figure 2C:
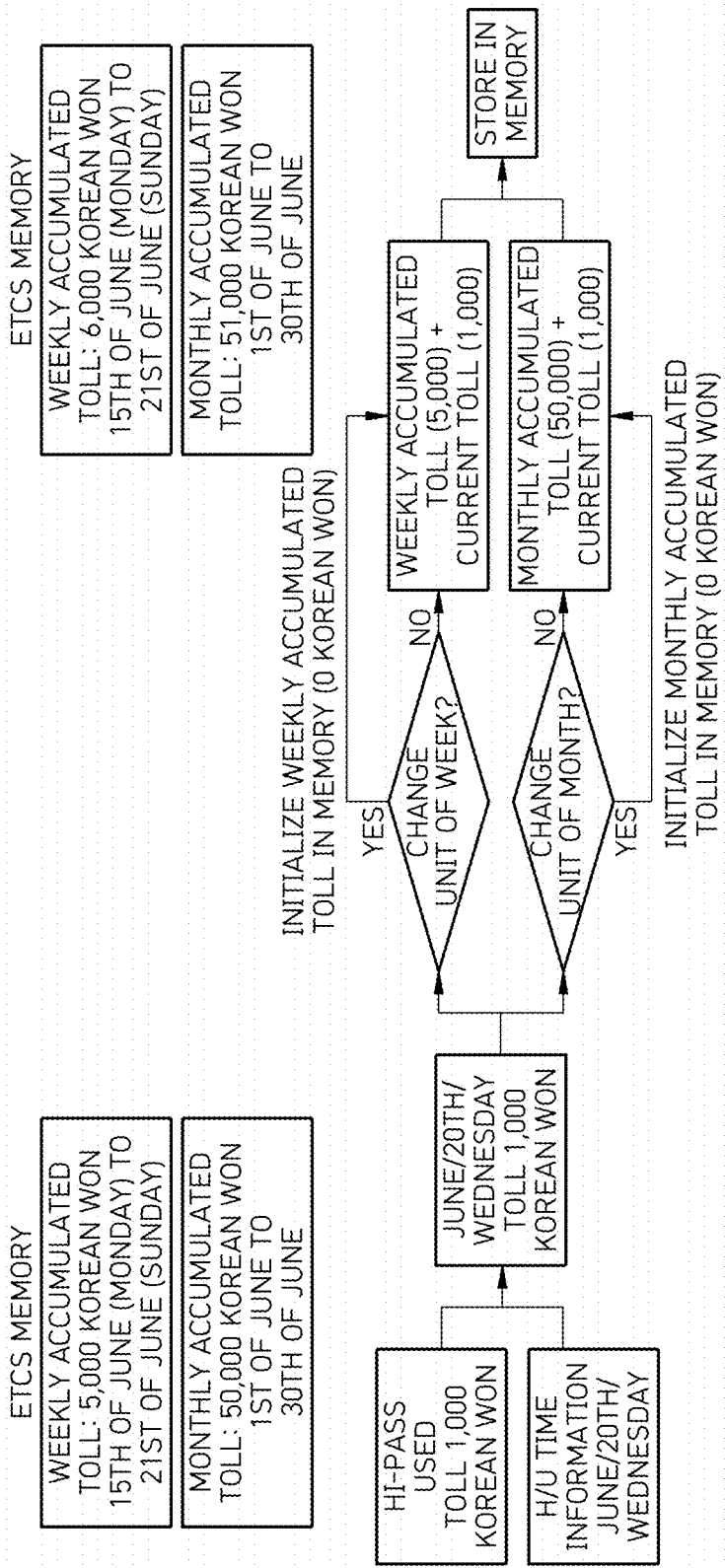

FIGS. 2C to 2F are diagrams illustrating a situation in which an accumulated toll is calculated when the setting of a predetermined period is changed. First, FIG. 2C illustrates a situation in which there is no change in the setting of the predetermined period. Referring to FIG. 2C, in a situation in which a weekly accumulated toll is 5,000 Korean won and a monthly accumulated toll is 50,000 Korean won, when a toll of 1,000 Korean won is produced on the 20th of June, the weekly toll and the monthly toll are cumulatively calculated to be 6,000 Korean won and 51,000 Korean won, which are then stored in the memory.

Figure 2D:
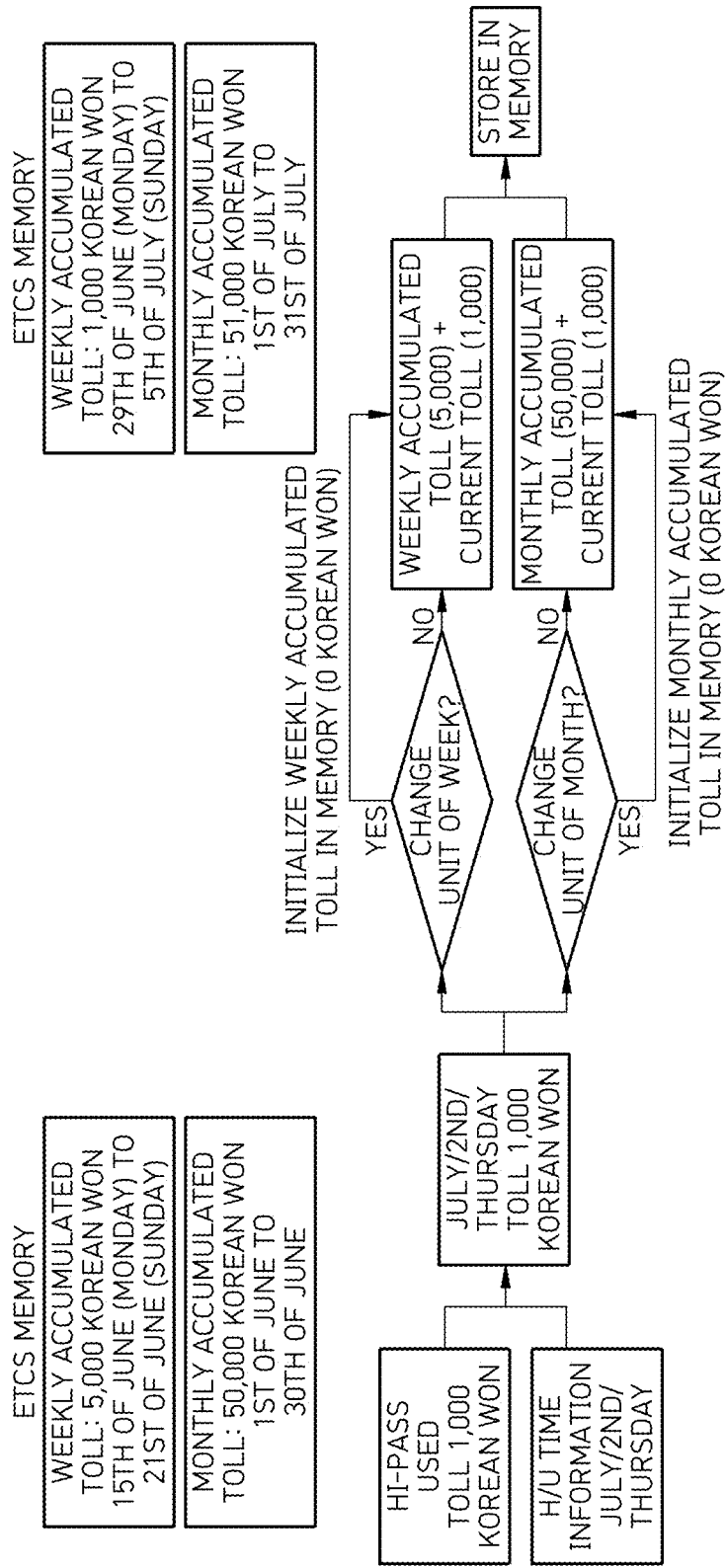

FIG. 2D illustrates a situation in which the unit of week and the unit of month are changed. In a situation in which the weekly accumulated toll is 5,000 Korean won and the monthly accumulated toll is 50,000 Korean won, when the toll of 1,000 Korean won is produced on the 20th of June, changing both the unit of week and the unit of month may cause the weekly accumulated toll and the monthly accumulated toll, previously stored in a cumulative manner, to be initialized, so that each of the weekly toll and the monthly toll is cumulatively calculated to be 1,000 Korean won, which is then stored in the memory.

Figure 2E:
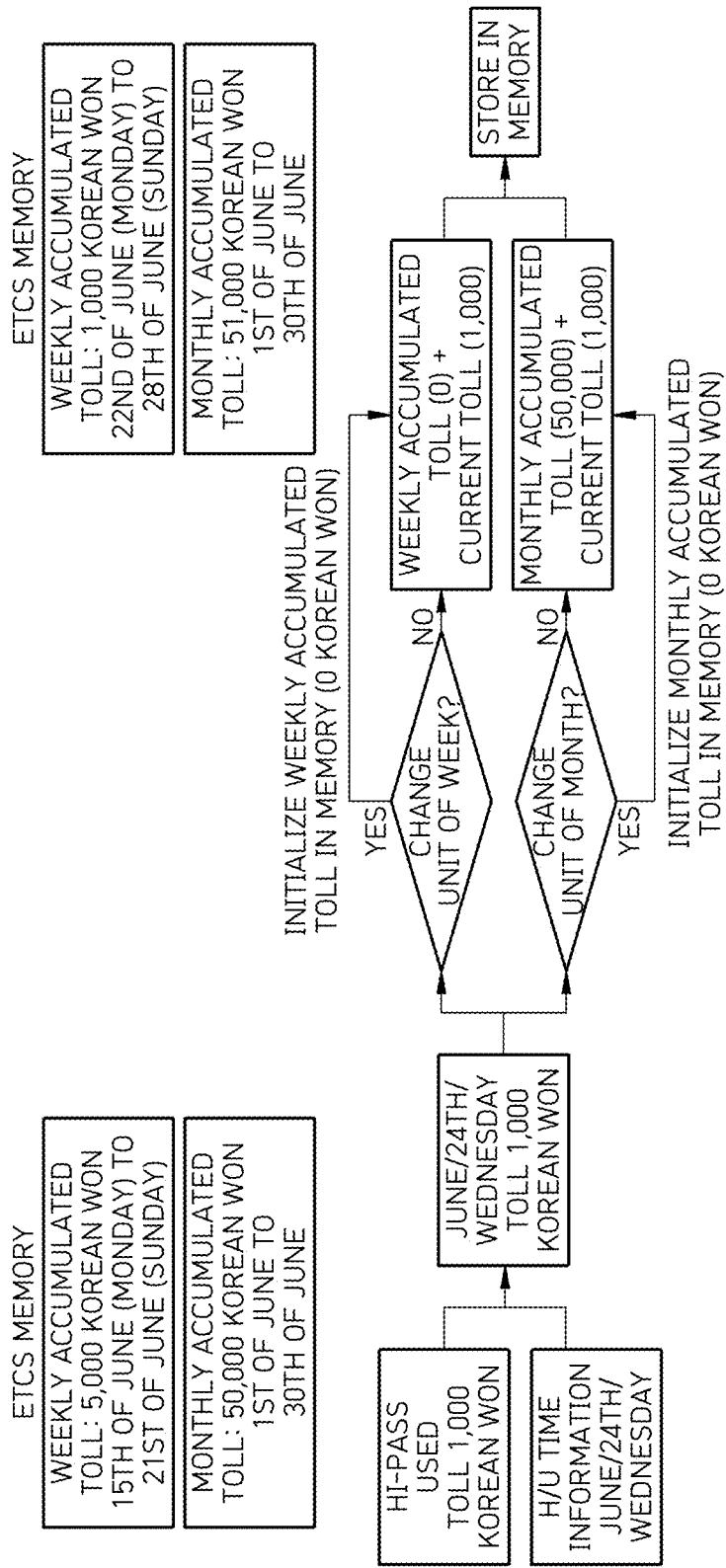

FIG. 2E illustrates a situation in which only the unit of week is changed while the unit of month is unchanged. In a situation in which the weekly accumulated toll is 5,000 Korean won and the monthly accumulated toll is 50,000 Korean won, when a toll of 1,000 Korean won is produced on the 24th of June, only changing the unit of week may cause the weekly accumulated toll, previously stored in a cumulative manner, to be initialized, so that the weekly toll is newly calculated to be 1,000 Korean won in a cumulative manner while the monthly toll is continuously accumulated to the previous monthly accumulated toll to be 51,000 Korean won in a cumulative manner. Consequently, resultant amounts of 1,000 Korean won and 51,000 Korean won are stored in the memory.

Figure 2F:
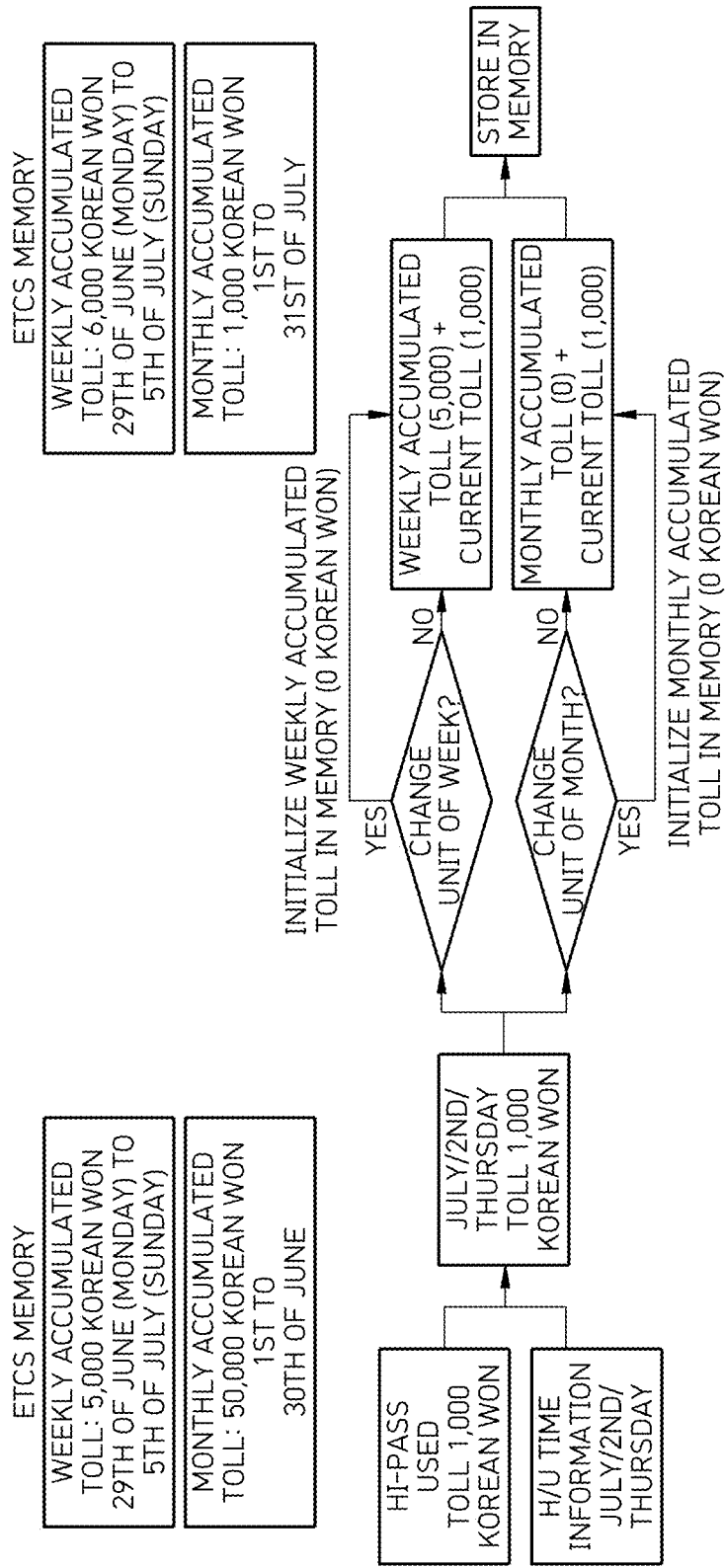

FIG. 2F illustrates a situation in which only the unit of month is changed while the unit of week is unchanged. In a situation in which the weekly accumulated toll is 5,000 Korean won and the monthly accumulated toll is 50,000 Korean won, when a toll of 1,000 Korean won is produced on the 2nd of July, only changing the unit of month may cause the monthly accumulated toll, previously stored in a cumulative manner, to be initialized, so that the monthly toll is newly calculated to be 1,000 Korean won in a cumulative manner while the weekly toll is continuously accumulated to the previous monthly accumulated toll to be 6,000 Korean won in a cumulative manner. Consequently, resultant amounts are stored in the memory.

Figure 3:
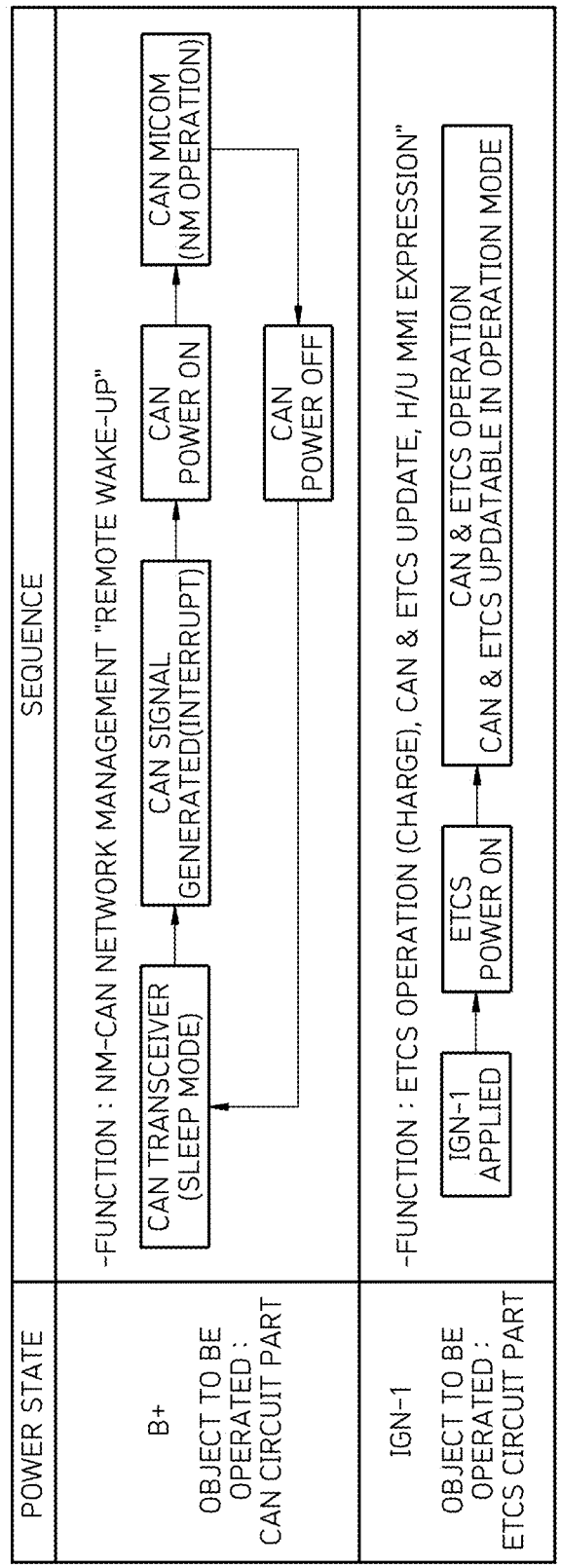
FIG. 3 is a diagram illustrating a process of activating and operating the CAN circuit part and the ETCS circuit part.

FIG. 3 is a diagram illustrating a process of activating and operating the CAN circuit part 120 and the ETCS circuit part 110.

In an embodiment, the CAN circuit part 120 operates in a sleep mode as initial constant power B+ is applied thereto. Afterwards, as a signal corresponding to the CAN communication (hereinafter, referred to as a "CAN communication signal") is generated, the CAN circuit part 120 is converted into and operates in a wake-up mode.

When an ignition signal is transferred to the ETCS circuit part 110, the ETCS circuit part 110 may start the entire operations in response to power being applied thereto.

At this time, the CAN circuit part 120, the ETCS circuit part 110, and the power circuit part 130 may be connected to connectors as illustrated in Table 1 and FIG. 1 so as to be transmit and receive CAN communication signals, ignition signals, and other signals.

TABLE 1

| Connector Type | Pins | Signal | Target to be Connected |
|---|---|---|---|
| Speaker Connector | 2 Pins | SPK+, SPK− | Speaker |
| Main Connector | 6 Pins | Two Buttons, Two LEDs, IGN-1, GND | OHCL PCB |
| CAN Connector | 4 Pins | CAN_High, CAN_Low, B+, GND | Vehicle Connector |

Figure 4:
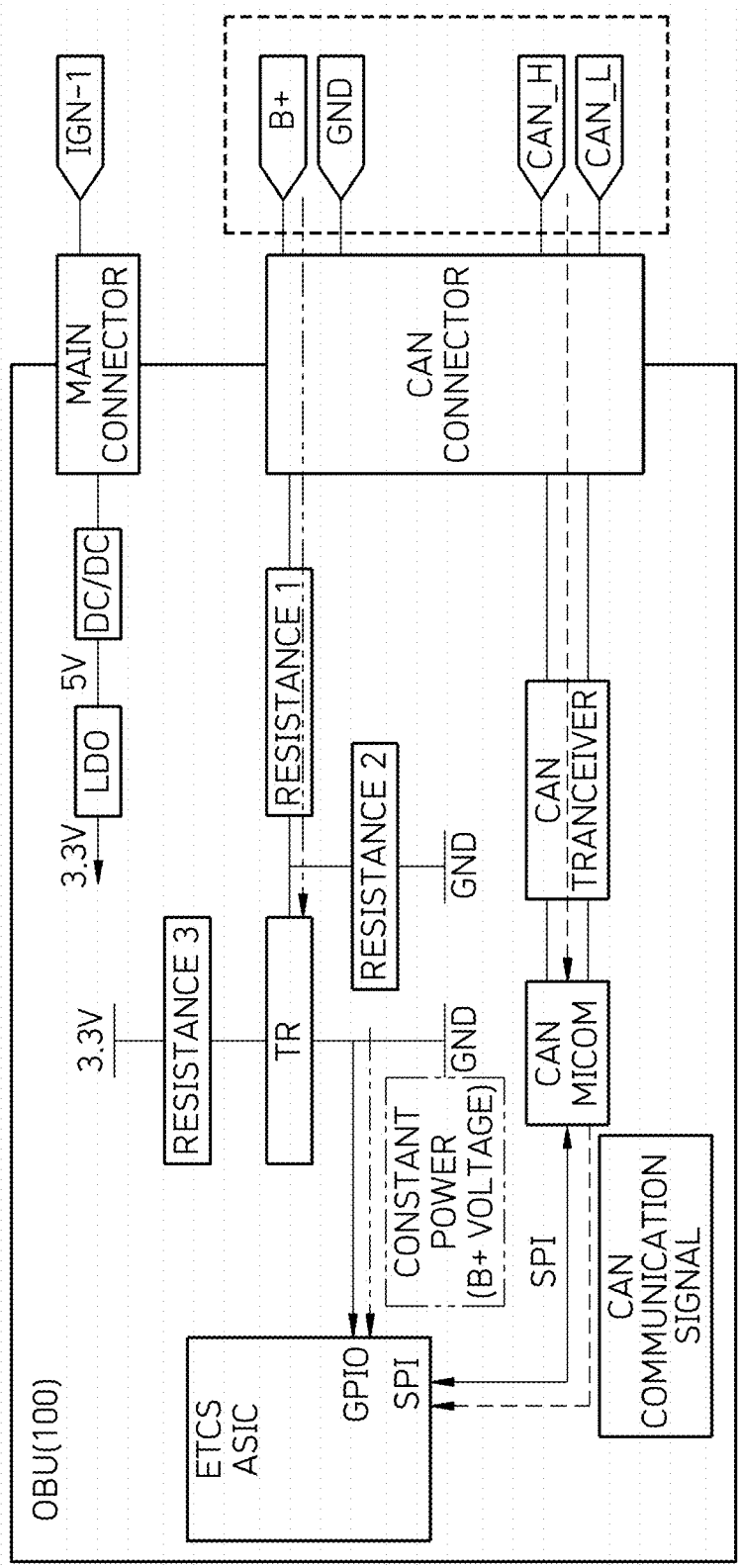
FIG. 4 is a diagram illustrating a CAN connector fastening diagnosis process.

FIG. 4 is a diagram illustrating a CAN connector fastening diagnosis process.

The OBU 100 according to embodiments of the present disclosure may perform CAN connector fastening diagnosis on the basis of whether constant power is applied or not and a CAN communication signal is generated or not.

That is, after an ignition signal is generated or when a button is operated by a user, the ETCS circuit part 110 may perform the CAN connector fastening diagnosis by reviewing whether or not constant power is applied to the CAN circuit part 120 and determining whether or not a CAN communication signal is generated.

For example, as in Table 2, when at least one of the constant power and the CAN communication signal is not applied, CAN connector fastening may be determined to be abnormal. When both the constant power and the CAN communication signal are applied, the CAN connector fastening may be determined to be normal.

TABLE 2

| Classif. | Step 1 Review whether B+ voltage is applied | Step 2 Review whether CAN signal is generated | Determination | Remarks |
|---|---|---|---|---|
| Diagnostic Part | GPIO | SPI: CAN message (HU_ETCS_ PE_01 - H/U Time information) | Diagnosed by ETCS ASIC | • New sound source is required for voice guidance of whether CAN connector is fastened or not<br>※ Diagnosis of CAN connector fastening |
| Not Fastened | Low | No signal | Abnormal | └ Fastened: "Dingdong. CAN connector is normal." |
| Fastened | High | No signal | Abnormal | └ Not Fastened: "Dingdong. CAN connector is abnormal." |
| Fastened | High | Signal | Normal | ※ Diagnosis of antenna connector fastening<br>└ Fastened: "Dingdong. Antenna connector is normal."<br>└ Not Fastened: "Dingdong. Antenna connector is abnormal." |

Specifically, the ETCS circuit part 110 may generate log information corresponding to the result of the connector fastening diagnosis. In an embodiment, the log information may include information regarding a status log, an event log, and an initial fastening time log included in the status log.

Here, the status log is log information indicating the fastened state and non-fastened state of a connector. The event log information includes a record of the history of changes in the status log. The history of changes in the status log may be reviewed through the event log. In this case, the event log may be stored to be a maximum of 255 bytes. The event log is recorded as a parameter value AC corresponding to initial fastening of a connector, and then is recorded whenever a parameter value BC or DC corresponding to non-fastening of a connector is generated. In the initial fastening time log, after a CAN connector is fastened, a time at which an initial signal is received from the head unit 200 is recorded as log information. Here, in the initial fastening time log, when the constant power is not input after the signal is initially received from the head unit 200, a BC parameter value is recorded in an SS unit.

According to embodiments of the present disclosure, the history of the fastening of the CAN connector may be reviewed on the basis of the above-described log information. The log information applied to the embodiment of the present disclosure is as in Table 3, and the meaning of each status log is as in Table 4.

TABLE 3

| Log | | Parameter Value | Time Point of Storage | Remarks |
|---|---|---|---|---|
| Status Log | 00 | Initial Value | Storable as initial value when OBU is mass produced or information is initialized | - Status log inquiry and initialization function<br>└ Command: @canlog + I (inquiry): AC 20180101 010101+ r (initialization) |
| | BC | Constant signal (B+) not input | Status is stored in case of IGN-1 OFF → ON (OBU power ON) or when button is operated: | - BC is stored in time SS unit when B+ is not input after initial H/U time is received<br>└ Ex) @canlog + I (inquiry): AC 20180101 0101BC |
| | DC | Constant signal (B+) input & no CAN communication signal | | |
| | AC | B+ input & CAN communication signal | | |
| | Date | | Time point of initial reception from head unit after fastening is stored | |
| Event Log | | ACDCBC... | Only changes in DC/BC are recorded after recording of change event from initial AC record | Event log inquiry<br>└ command: @dsrclog + i: @canlog ACDCBCDCBCDC |

TABLE 4

| Status Log | Fastening Status | Voice Guidance | LED Operation Specification |
|---|---|---|---|
| 00 | Connector has never been fastened | — | Red blinking |
| AC | Connector fastened | "Dingdong. CAN connector is normal." | Following normal/abnormal operation specification (Normal: Green blinking, Abnormal: Red blinking) |
| BC or DC | Connector not fastened | "Chime. CAN connector is abnormal." | Red blinking (Continuous blinking) |

In addition, embodiments of the present disclosure may further provide encryption and decryption functions for a software application installed in the ETCS circuit part 110 for security enhancement.

Returning to FIG. 1, embodiments of the present disclosure may control a navigation screen to display the ETCS information thereon or the speaker provided in the head unit

200 to output the ETCS information in voice when the ETCS information is received from the OBU 100.

In addition, when the head unit 200 receives the ETCS information from the OBU 100, the ETCS information may be displayed on at least one of a cluster and a head-up display (HUD) device so as to meet predetermined set conditions. Here, the predetermined set conditions may be conditions set for each piece of the ETCS information so as to be displayed on each display device, or may be conditions in which a display position is set by the user. For example, in a situation in which the HUD device is used, when a toll is charged in response to the vehicle passing by the RSE, the toll may be output through the HUD device together with a voice output. In a situation in which the HUD device is deactivated, the OBU or the system including the same may be set so that the toll is displayed through the cluster or on the navigation screen.

According to embodiments of the present disclosure as described above, the OBU 100 works in concert with the head unit, so that a plurality of pieces of ETCS information generated by the OBU 100 can be transferred to the head unit 200 through the CAN communication. Consequently, it is possible to advantageously provide the plurality of pieces of ETCS information to the user through a variety of devices.

Figure 5:
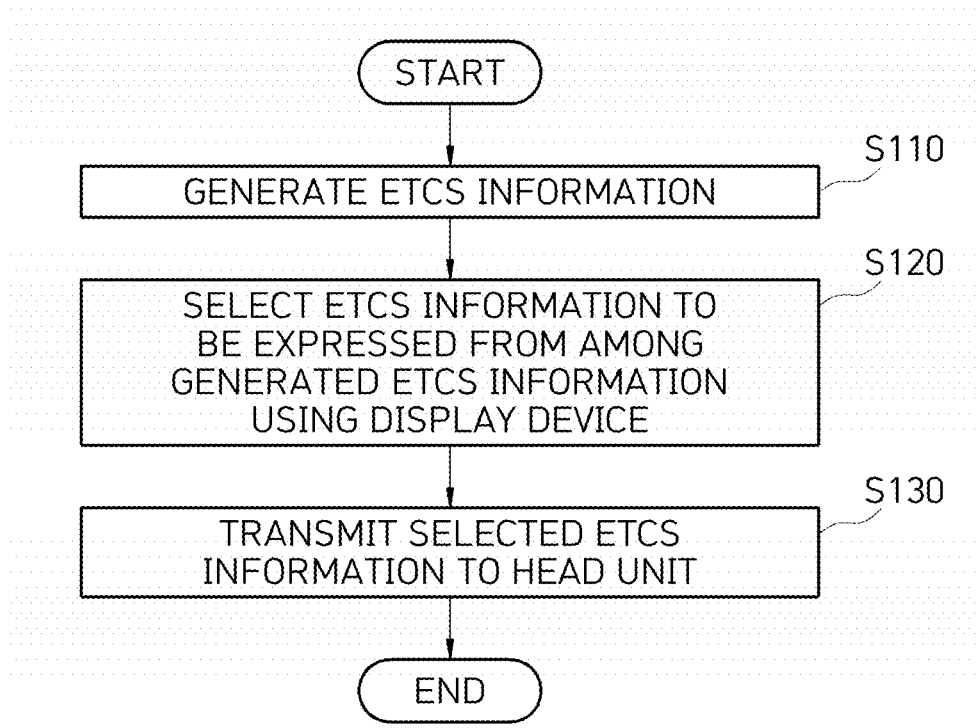
FIG. 5 is a flowchart illustrating a method of operating the OBU in concert with the head unit according to embodiments of the present disclosure.

FIG. 5 is a flowchart illustrating a method of operating the OBU 100 in concert with the head unit 200 according to embodiments of the present disclosure.

Respective steps illustrated in FIG. 5 may be understood as being performed by the OBU 100 described above with reference to FIGS. 1 to 4, but are not limited thereto.

In the method of operating the OBU 100 in concert with the head unit 200 according to embodiments of the present disclosure, predetermined ETCS information is generated in S110, and at least one piece thereof intended to be displayed on the display device of the head unit 200 is selected from among a plurality of pieces of the ETCS information.

Afterwards, the selected ETCS information is transmitted to the head unit 200 through the CAN circuit part 120 in S130.

In the above description, steps S110 to S130 may be further divided into additional steps or may be provided as a combination of sub-steps according to implementations of the present disclosure. In addition, some steps may be omitted as required, or the order of some steps may be changed. Furthermore, features described with reference to or illustrated in FIGS. 1 to 4 may be applied to the method illustrated in FIG. 5 even in the case that descriptions thereof are omitted.

Hereinafter, with reference to FIGS. 6 to 8, the OBU 100 according to embodiments of the present disclosure, a vehicle system including same, and a method of updating the same will be described. Meanwhile, descriptions of some features repetitive of those described above with reference to FIGS. 1 to 5 will be omitted, but it should be understood that the omitted features are not excluded from implementations of the present disclosure.

Figure 6:
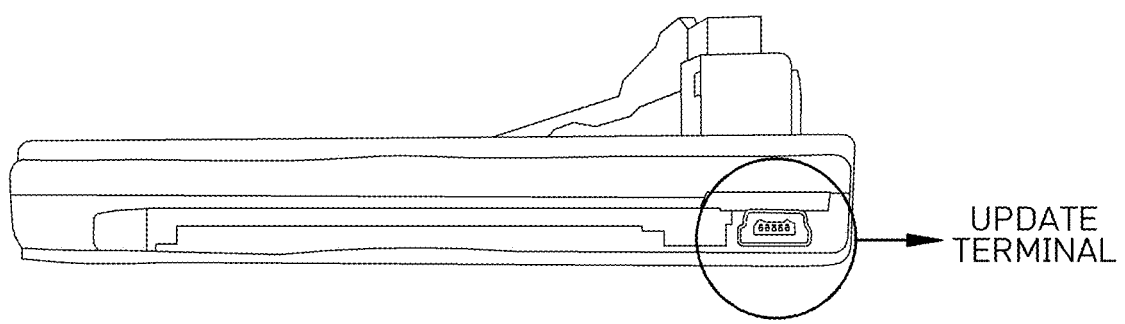
FIG. 6 is a schematic view illustrating a conventional OBU.

FIG. 6 is a schematic view illustrating a conventional OBU 100.

In the conventional OBU, it has been required to fasten a separate connector to an update terminal in order to update a control program using a stand-alone control method.

Thus, the driver has been required to visit a vehicle service station in order to update the OBU, and the vehicle service station has also been required to be provided with separate devices, such as a personal computer (PC) and an update cable, in order to update the OBU.

In order to overcome this problem, embodiments of the present disclosure provide the OBU 100 able to easily update a control program of the OBU 100 through the CAN communication by working in concert with the head unit 200, the vehicle system including the OBU 100, and the method of updating the OBU 100.

Figure 7:
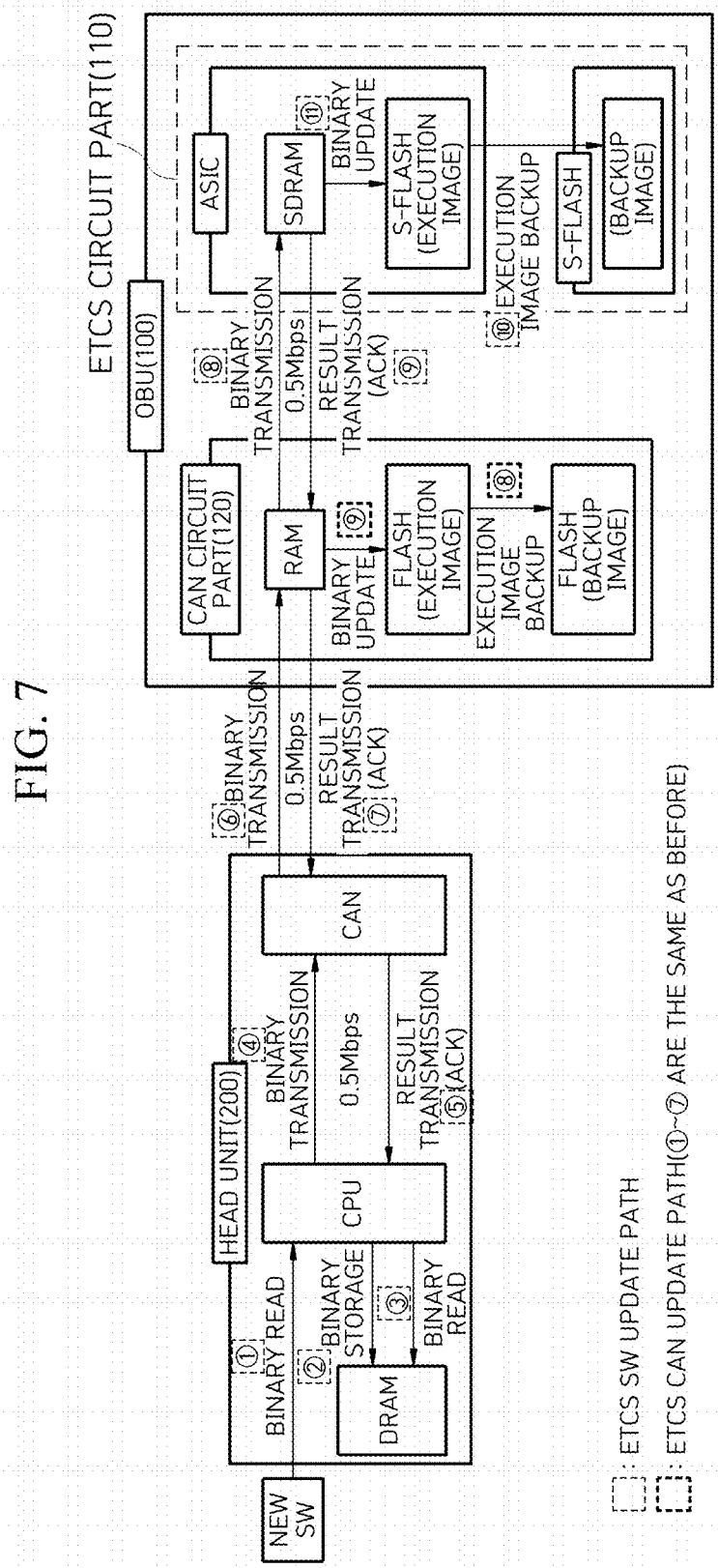
FIG. 7 is a diagram illustrating a vehicle system according to embodiments of the present disclosure.

FIG. 7 is a diagram illustrating a vehicle system according to embodiments of the present disclosure.

The vehicle system according to embodiments of the present disclosure includes the head unit 200 and the OBU 100.

The head unit 200 receives update target data for updating the OBU 100 from an external server and provides the update target data to the OBU 100.

In an embodiment, when the update target data is received from the external server according to a predetermined wireless communication method, the head unit 200 stores the received update target data in the internal memory thereof, reads the stored update target data, and transmits the update target data to the OBU 100 through the CAN circuit part 120.

Specifically, when the update target data is received from the external server, a controller of the head unit 200 stores the update target data in the internal memory and then reads the stored update target data and transmits the update target data to the CAN circuit part 120. When the update target data is received, the CAN circuit part 120 transmits the result of the reception to the controller and then provides the update target data to the OBU 100.

When the update target data is received from the head unit 200 using a CAN communication method, the OBU 100 executes the update target data and updates an execution result control program.

Specifically, when the update target data is received from the head unit 200, the CAN circuit part 120 of the OBU 100 may transmit the result of the reception to the head unit 200 and store an execution image of the update target data and a backup image of the execution image in the internal memory.

Here, the CAN circuit part 120 may compare the backup image with a previously stored version of the update target data by storing the backup image in the internal memory. When update to a new version is required as the result of the comparison, the CAN circuit part 120 may provide newly received update target data to the ETCS circuit part 110. In addition, when there is an error in the control program stored in the ETCS circuit part 110, the backup image of the update target data may be read, thereby enabling the control program to be restored.

Meanwhile, the update target data received by the CAN circuit part 120 may be intended to update the control program for the CAN communication between the CAN circuit part 120 and the head unit 200. When the update target data is received, the CAN circuit part 120 may update the control program through an execution image and, before starting the update, store a backup image of the execution image in the internal memory as described above.

When the update target data is received from the CAN circuit part 120, the ETCS circuit part 110 of the OBU 100 may transmit the result of the reception to the CAN circuit part 120 and store an execution image of the update target data and a backup image of the execution image in the internal memory. Here, the internal memory of the CAN circuit part 120 and the internal memory of the ETCS circuit part 110 may be formed of different memory regions.

Afterwards, the ETCS circuit part 110 may update the control program previously installed on the basis of the execution image. Here, the update target data may be configured to update the control program of the ETCS circuit part 110.

Here, when an error has occurred in the update processing, the ETCS circuit part 110 may read the backup image stored in the internal memory and re-perform the update on the basis thereof. In addition, when the backup image is read and it has failed to perform the update a predetermined or greater number of times, the ETCS circuit part 110 may re-perform the update by receiving the backup image or the execution image stored in the internal memory of the CAN circuit part 120.

In addition, when there is an error in the control program, the ETCS circuit part 110 may read the previously-stored backup image of the update target data and allow the control program to be restored.

As described above, embodiments of the present disclosure may simply perform the update by receiving update target data through the head unit 200, wherein the update target data is used to integrally update control programs of the OBU 100. In addition, embodiments of the present disclosure may independently update the ETCS circuit part 110 and the CAN circuit part 120 by receiving update target data from the head unit 200, wherein the update target data is used to update control programs of the ETCS circuit part 110 and the CAN circuit part 120.

Meanwhile, embodiments of the present disclosure may transmit and receive the update target data not only through the CAN communication, but also using an over-the-air (OTA) system, a diagnostic device, an external terminal (USB), etc.

Figure 8:
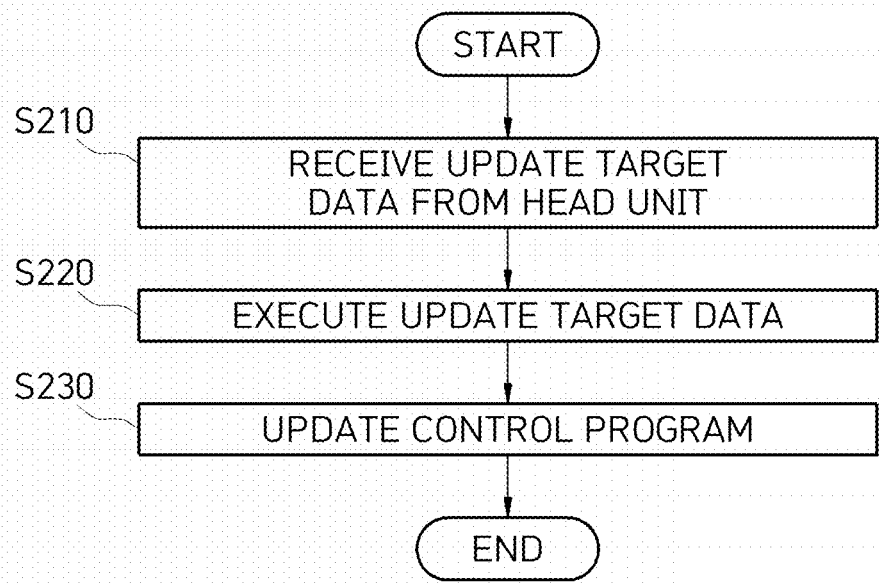
FIG. 8 is a flowchart illustrating a method of updating the OBU able to work in concert with the in-vehicle head unit according to embodiments of the present disclosure.

FIG. 8 is a flowchart illustrating a method of updating the OBU 100 able to work in concert with the in-vehicle head unit 200 according to embodiments of the present disclosure.

Meanwhile, respective steps illustrated in FIG. 8 may be understood as being performed by the OBU 100 and the vehicle system described with reference to FIGS. 1 and 7, but are not limited thereto.

First, in S210, the OBU 100 receives the update target data from the head unit 200 through the CAN communication.

Afterwards, the OBU 100 executes the received update target data in S220 and updates the control program as the result of the execution of the update target data in S230.

Here, according to embodiments of the present disclosure, when the update target data is received from the head unit 200, the CAN circuit part 120 may transmit the result of the reception to the head unit 200 and store the execution image of the update target data and the backup image of the execution image in the internal memory of the CAN circuit part 120.

In addition, when the update target data is received from the CAN circuit part 120, the ETCS circuit part 110 may transmit the result of the reception to the CAN circuit part 120 and store the execution image of the update target data and the backup image of the execution image in the internal memory of the ETCS circuit part 110.

In the above description, the steps may further be divided into additional steps or may be provided as a combination of sub-steps according to implementations of the present disclosure. In addition, some steps may be omitted as required, or the order of some steps may be changed. Furthermore, features described with reference to or illustrated in FIGS. 1 to 7 may be applied to an update method illustrated in FIG. 8 even in the case that descriptions thereof are omitted.

In the OBU 100 able to work in concert with the in-vehicle head unit 200, the vehicle system, and the update method according to embodiments of the present disclosure, transmission/reception times as in Table 5 are consumed. Here, transmission times in Table 5 are obtained on the assumption that the data transmission success rate is 100%, in which the internal processing time in the head unit 200 and the CAN processing time inside the OBU 100 are omitted.

TABLE 5

| Expected Transmission Time | | | |
|---|---|---|---|
| ETCS ASIC App. SW | Sound source DB | CAN MCU App. SW | Remarks |
| About 31 seconds | About 10 minutes and 30 seconds | About 5 seconds | UDS protocol |

Hereinafter, with reference to FIGS. 9 to 15, a process of paying an electronic card charge by the OBU 100 using the vehicle payment system will be described.

Figure 9:
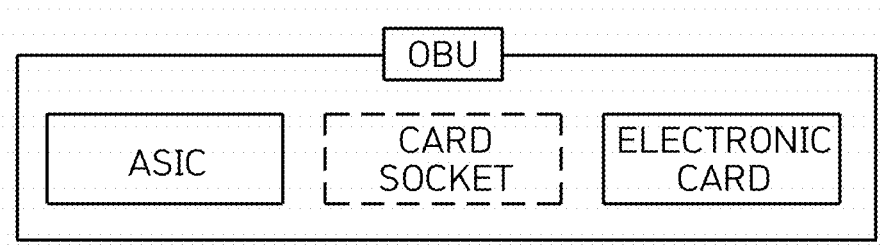
FIG. 9 is a diagram illustrating the OBU used in a vehicle.

FIG. 9 is a diagram illustrating the OBU 100 used in a vehicle.

The OBU 100 used in a conventional vehicle is configured such that the electronic card may be inserted into the socket of the OBU 100. The OBU 100 reads information from the electronic card inserted into the socket and transmits and receives the information to and from the RSE.

Here, types of the electronic card inserted into the socket may include a prepaid card, a postpaid card, a discount prepaid card, an automatic recharge card, etc.

Since the OBU 100 requires the electronic card to be directly input into the socket of the OBU 100 as described above, the size of the OBU 100 is inevitably increased, which is problematic. That is, a card socket having functions of, for example, allowing a card to be fixed therein, ejecting the card therefrom, and allowing data to be transmitted, is required in the OBU 100.

In addition, since a conventional OBU 100 requires a real electronic card to be inserted thereinto, there has been a risk such as theft or loss.

In contrast, embodiments of the present disclosure are characterized in that the socket into which the electronic card may be inserted is removed from the OBU 100, and that an electronic card charge may be paid using the payment means of the in-vehicle payment system in the head unit 200 using a predetermined communication method.

Meanwhile, according to embodiments of the present disclosure, the OBU 100 may receive information regarding the payment means of the in-vehicle payment system in the head unit 200 through CAN communication or universal asynchronous receiver/transmitter (UART) communication, or store the information regarding the payment means on the basis of the memory. These features will be respectively described as follows.

Figure 10:
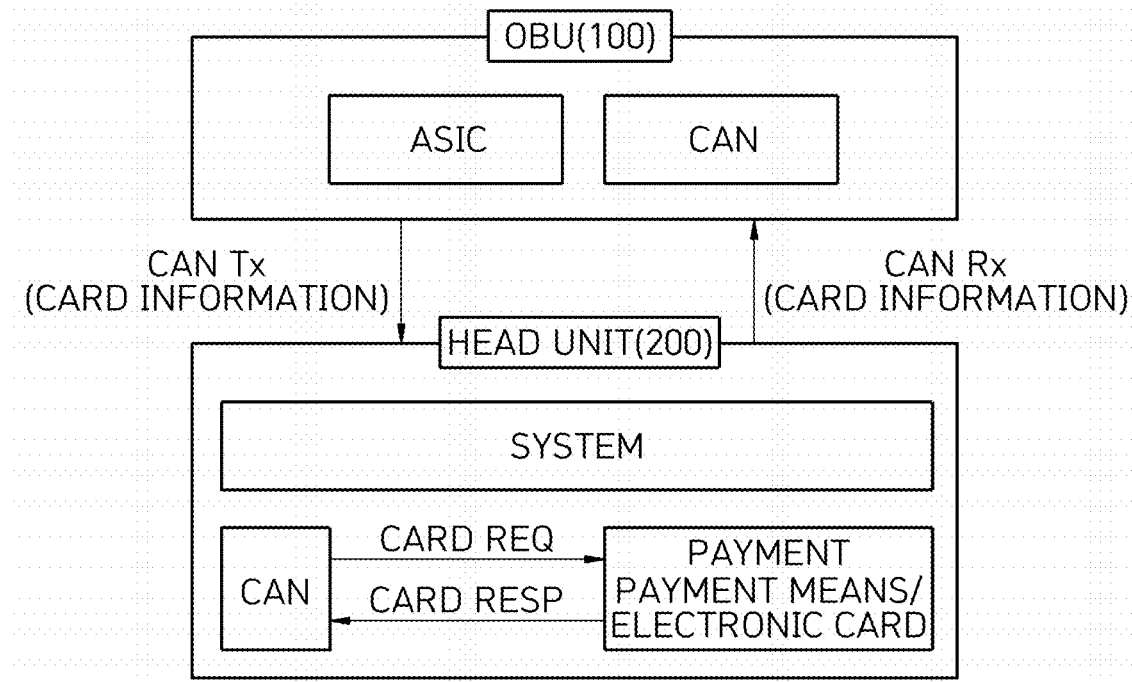
FIG. 10 is a diagram illustrating the OBU able to pay an electronic card charge through CAN communication.

FIG. 10 is a diagram illustrating the OBU 100 able to pay an electronic card charge through CAN communication.

The OBU 100 according to embodiments of the present disclosure may pay the electronic card charge using the payment means of the vehicle payment system of the in-vehicle head unit 200. Here, the embodiment illustrated in FIG. 10 is characterized in that the OBU 100 receives information regarding the payment means of the vehicle payment system of the in-vehicle head unit 200 using the CAN communication.

The OBU 100 according to embodiments of the present disclosure includes the CAN circuit part 120 and the ETCS circuit part 110.

The CAN circuit part 120 transmits and receives data to and from the head unit 200 through the CAN communication.

When a transaction request to the electronic card is received during passing by the RSE, the ETCS circuit part requests information regarding a predetermined payment means in the vehicle payment system through the CAN circuit part 120.

In an embodiment, a payment means is previously registered and stored in the vehicle payment system by a user. The payment means registered in the vehicle payment system may be a credit card, but is not limited thereto. Various payment means, such as a payment account and simple payment information, registered by the user in person may be stored as information regarding the payment means.

Meanwhile, the registration of the payment means in the vehicle payment system may be performed in a variety of methods. For example, the user may register the information regarding the payment means (e.g., credit card information) by inputting the information in person through an interface of the head unit or by reading the information regarding the payment means stored in a user terminal, such as a PC or a smartphone, and storing the information regarding the payment means. When power is supplied in response to the vehicle being turned on, the vehicle payment system may manage the payment means by reviewing whether or not the stored information regarding the payment means is valid.

When the information regarding the payment means is requested through the CAN communication, the head unit 200 reads the information regarding the payment means, previously registered in the vehicle payment system, and transmits the information regarding the payment means to the CAN circuit part 120 of the OBU 100.

When the information regarding the payment means is received from the vehicle payment system through the CAN communication, the ETCS circuit part 110 performs a control operation so that a transaction response corresponding to the transaction request from the RSE, based on the received information regarding the payment means, is transmitted to the RSE.

Here, communication processing between the RSE and the OBU 100 may be performed through a dedicated short range communication (DSRC) band based on an antenna, but is not limited thereto. For example, a variety of next-generation frequency bands, such as a WAVE frequency, may also be included.

As described above, the OBU 100 according to embodiments of the present disclosure pays an electronic card charge using the payment means, and thus is characterized by not being provided with a socket into which the electronic card is to be inserted.

In an embodiment, the ETCS circuit part 110 may previously store the information regarding the payment means by requesting the information regarding the payment means from the vehicle payment system through the CAN circuit part 120.

For example, when the vehicle is turned on, the ETCS circuit part 110 may register the information regarding the payment means by requesting the information regarding the payment means from the vehicle payment system. When the vehicle is turned off, the stored information regarding the payment means is deleted. In addition, after the vehicle is turned on, the ETCS circuit part 110 may request the information regarding the payment means from the vehicle payment system every predetermined period and store the information regarding the payment means.

Meanwhile, embodiments of the present disclosure pay a toll by receiving the information regarding the payment means from the vehicle payment system instead of being provided with the electronic card. Here, the information regarding the payment means, previously registered in the vehicle payment system, may be information regarding the electronic card. That is, embodiments of the present disclosure may be configured such that the electronic card, such as a Hi-pass card, may be previously registered in the vehicle payment system on the basis of software.

Thus, not only the payment means but also the electronic card may be registered in the vehicle payment system. When a charge request is received from the RSE, the OBU 100 may enable the charge to be paid by a process of requesting the information regarding the electronic card from the vehicle payment system through the CAN communication and transmitting the information regarding the electronic card to the RSE.

According to embodiments of the present disclosure as described above, there is an advantage in that a variety of errors, such as an insertion error and a recognition failure error of the electronic card, can be fundamentally removed. It is unnecessary to insert or purchase the electronic card, and it is possible to remove the socket in the OBU 100, thereby reducing costs.

Figure 11:
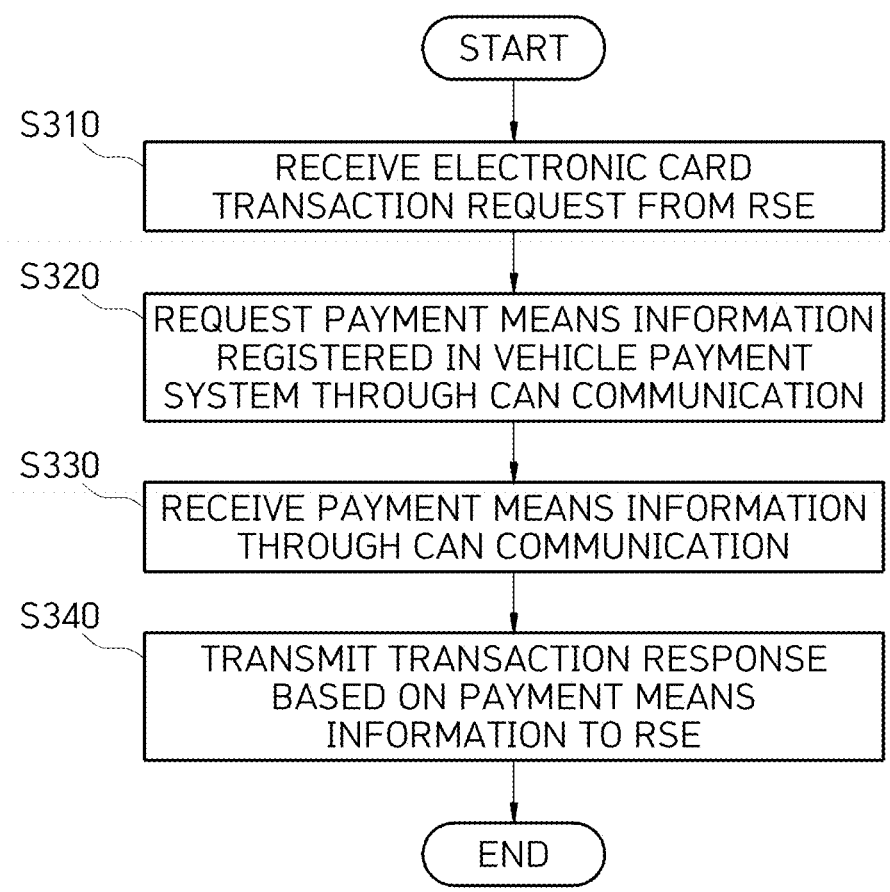
FIG. 11 is a flowchart illustrating a method of paying an electronic card charge through CAN communication.

FIG. 11 is a flowchart illustrating a method of paying an electronic card charge through CAN communication.

Meanwhile, respective steps illustrated in FIG. 11 may be understood as being performed by the OBU 100 illustrated in FIG. 10, but are not limited thereto.

First, the OBU 100 receives a transaction request for the electronic card from the RSE when passing by the RSE in S310.

Afterwards, when the transaction request is received, the information regarding the payment means, previously set in the vehicle payment system, is requested through the CAN communication in S320.

Thereafter, the information regarding the payment means is received from the vehicle payment system through the CAN communication in S330, and a transaction response corresponding to the transaction request based on the received information regarding the payment means is transmitted to the RSE in S340.

Figure 12:
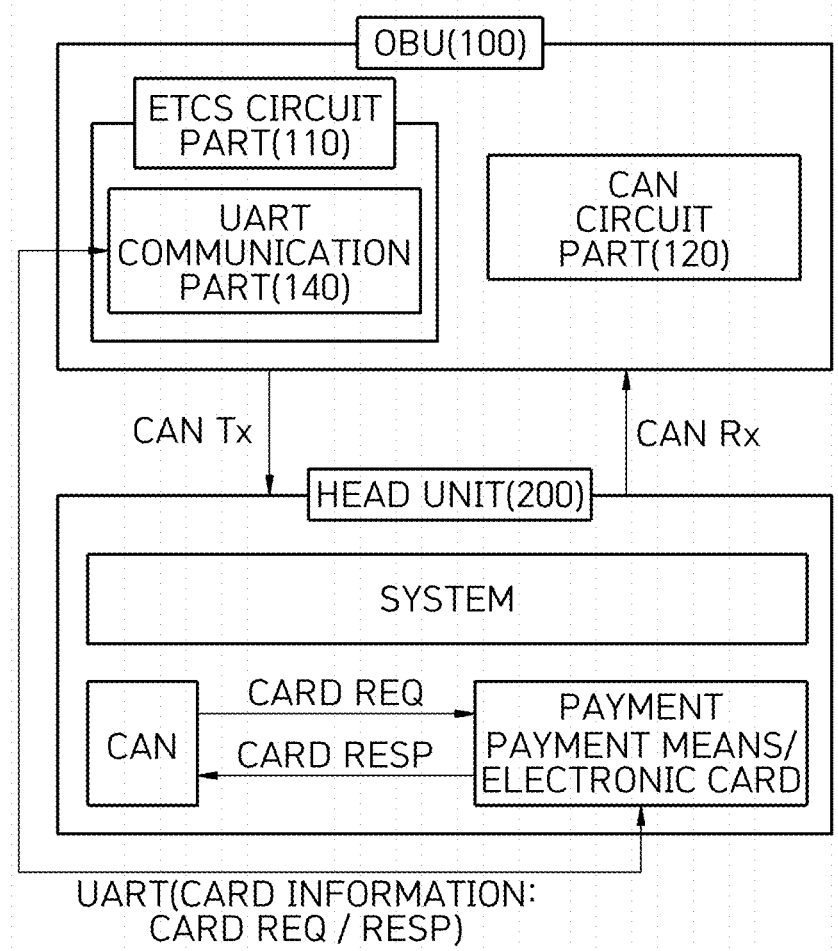
FIG. 12 is a diagram illustrating the OBU able to pay an electronic card charge through UART communication.

FIG. 12 is a diagram illustrating the OBU 100 able to pay an electronic card charge through UART communication.

In the foregoing embodiment using the CAN communication according to the present disclosure, not only the information regarding the ETCS circuit part but also the information regarding other control parts is exchanged through a CAN bus, there is a probability that load may occur in the CAN communication. In this case, an error may occur in charging and payment of a toll during passing by the RSE at a high speed.

In order to overcome such problems, embodiments of the present disclosure are characterized in that joint operation of the head unit 200 and the OBU 100 may be enabled through the CAN communication, and the OBU 100 may work in concert with the vehicle payment system through the UART communication separate from the CAN communication in consideration of load during the CAN communication, to thereby pay a toll charge using the payment means.

In the following description of embodiments illustrated in FIGS. 12 to 19, descriptions of some features repetitive of those of the OBU 100 and the method of paying an electronic card charge described above with reference to FIGS.

10 and 11 will be omitted, but it should be understood that the omitted features are not excluded from the scope of the present disclosure.

The OBU 100 according to embodiments of the present disclosure includes a CAN circuit part 120, an UART communication part 140, and an ETCS circuit part 110.

The CAN circuit part 120 transmits and receives data to and from the head unit 200 through the CAN communication.

The UART communication part 140 transmits and receives data to and from the vehicle payment system of the head unit 200 through the UART communication. Here, the UART communication part 140 may be provided in the ETCS circuit part 110.

Here, the CAN circuit part 120 may transmit and receive data for joint operation with the head unit 200, whereas the UART communication part 140 may transmit and receive data for payment to and from the vehicle payment system.

When the transaction request for the electronic card is received from the RSE during passing by the RSE, the ETCS circuit part requests the information regarding the payment means, previously set in the vehicle payment system, through the UART communication part 140.

After the joint operation of the head unit 200 and the OBU 100 is established through the CAN circuit part 120, when the information regarding the payment means is requested through the UART communication part 140, the head unit 200 reads the information regarding the payment means, previously registered in the vehicle payment system, and transmits the information regarding the payment means to the UART communication part 140 of the OBU 100.

When the information regarding the payment means is received from the vehicle payment system through the UART communication, the ETCS circuit part 110 performs a control operation so that a transaction response corresponding to the transaction request from the RSE, based on the received information regarding the payment means, is transmitted to the RSE.

As described above, the OBU 100 according to embodiments of the present disclosure pays an electronic card charge using the payment means, and thus is characterized by not being provided with a socket into which the electronic card is to be inserted.

In an embodiment, the ETCS circuit part 110 may request the information regarding the payment means from the vehicle payment system through the UART communication part 140 and previously store the information regarding the payment means.

For example, when the vehicle is turned on, the ETCS circuit part 110 may request the information regarding the payment means from the vehicle payment system and store the information regarding the payment means. When the vehicle is turned off, the stored information regarding the payment means is deleted. In addition, after the vehicle is turned on, the ETCS circuit part 110 may request the information regarding the payment means from the vehicle payment system every predetermined period and store the information regarding the payment means.

Meanwhile, embodiments of the present disclosure pay a toll by receiving the information regarding the payment means from the vehicle payment system instead of being provided with the electronic card. Here, the information regarding the payment means, previously registered in the vehicle payment system, may be information regarding the electronic card. That is, embodiments of the present disclosure may be configured such that the electronic card, such as a Hi-pass card, may be previously registered in the vehicle payment system on the basis of software.

Thus, not only the payment means but also the electronic card may be registered in the vehicle payment system. When a charge request is received from the RSE, the OBU 100 may enable the charge to be paid by a process of requesting the information regarding the electronic card from the vehicle payment system through the UART communication and transmitting the information regarding the electronic card to the RSE.

In addition, the OBU 100 according to embodiments of the present disclosure may operate the transaction request and the transaction response by selecting one of the CAN circuit part 120 and the UART communication part 140 in consideration of the degree of load on the CAN circuit part 120. For example, when the load of data currently transmitted and received by the CAN circuit part 120 is equal to or greater than a predetermined amount of load, the ETCS circuit part 110 may transmit and receive the transaction request and the transaction response through the UART communication part 140. In the opposite situation, the ETCS circuit part 110 may perform transmission and reception through the CAN circuit part 120, and the UART communication part 140 may be operated in a sleep mode.

According to embodiments of the present disclosure as described above, there is an advantage in that a variety of errors, such as an insertion error and a recognition failure error of the electronic card, can be fundamentally removed. It is unnecessary to insert or purchase the electronic card, and it is possible to remove the socket in the OBU 100, thereby reducing costs. In addition, even in the case that load occurs in the CAN communication, the toll can be reliably charged and paid.

Figure 13:
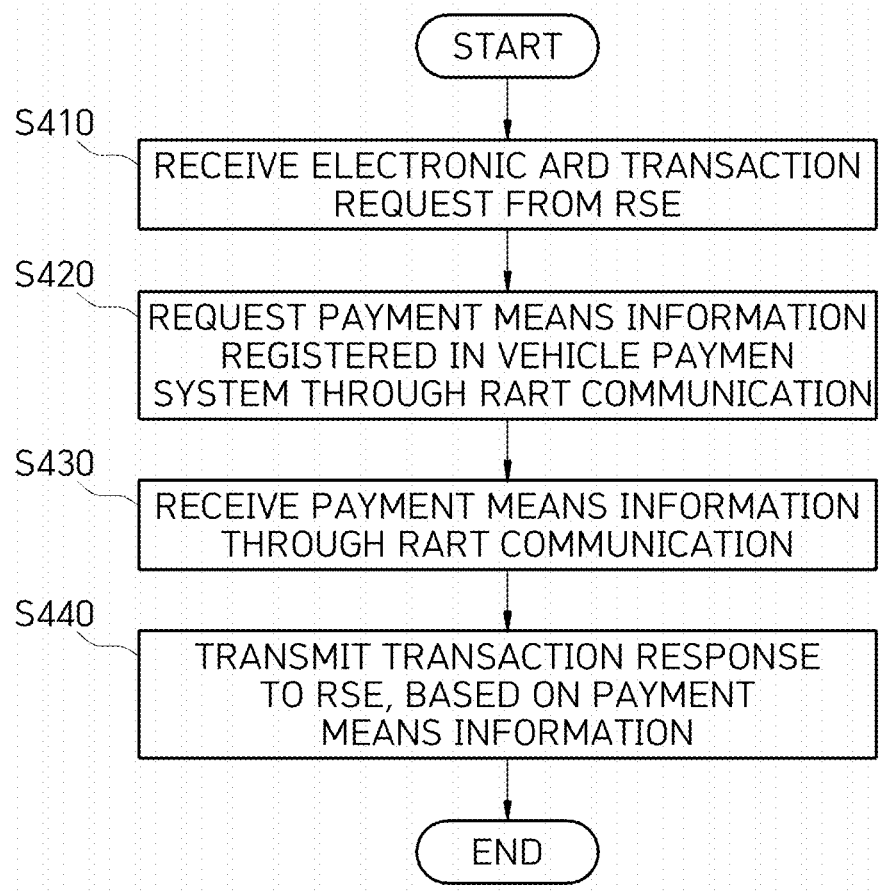
FIG. 13 is a flowchart illustrating a method of paying an electronic card charge through UART communication.

FIG. 13 is a flowchart illustrating a method of paying an electronic card charge through UART communication.

Respective steps illustrated in FIG. 13 may be understood as being performed by the OBU 100 described above with reference to FIG. 12, but are not limited thereto.

First, the OBU 100 receives a transaction request for the electronic card from the RSE when passing by the RSE in S410.

Afterwards, when the transaction request is received, the information regarding the payment means, previously set in the vehicle payment system, is requested through the UART communication in S420.

Thereafter, the information regarding the payment means is received from the vehicle payment system through the UART communication in S430, and a transaction response corresponding to the transaction request, based on the received information regarding the payment means, is transmitted to the RSE in S340.

Figure 14:
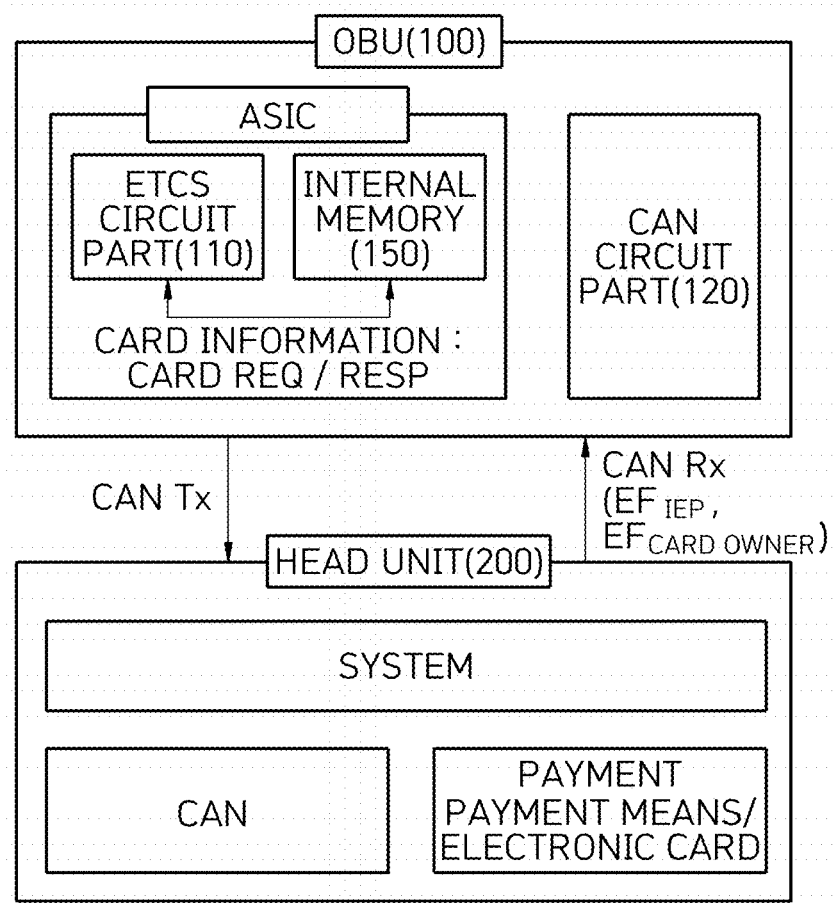
FIG. 14 is a diagram illustrating the OBU able to pay an electronic card charge on the basis of a memory.

FIG. 14 is a diagram illustrating the OBU 100 able to pay an electronic card charge on the basis of a memory.

Embodiments of the present disclosure are characterized in that a toll charge may be paid using the payment means by previously storing the information regarding the payment means in an internal memory 150 even in the case that the head unit 200 having a vehicle payment system function is broken or malfunctioning due to the update in the embodiment using the above-described CAN communication or UART communication.

In the following description of embodiments illustrated in FIGS. 14 to 19, descriptions of some features repetitive of those of the OBU 100 and the method of paying an electronic card charge described above with reference to FIGS. 10 to 13 will be omitted for the sake of brevity, but it should be understood that the omitted features are not excluded from the scope of the present disclosure.

The OBU 100 according to embodiments of the present disclosure includes the CAN circuit part 120, the internal memory 150, and the ETCS circuit part 110.

The CAN circuit part 120 transmits and receives data to and from the head unit 200 through the CAN communication.

The information regarding the payment means of the vehicle payment system is stored in the internal memory 150. Here, the internal memory 150 may be provided in the ETCS circuit part 110.

When the vehicle is turned on, the ETCS circuit part 110 receives the information regarding the payment means previously set in the vehicle payment system. In addition, the received information regarding the payment means is stored in the internal memory 150. Here, as the vehicle is turned on, the ETCS circuit part 110 may request the information regarding the payment means from the vehicle payment system every predetermined period.

Afterwards, when the transaction request for the electronic card is received from the RSE during passing by the RSE, the ETCS circuit part 110 is controlled to store the information regarding the payment means stored in the internal memory 150 and transmit the transaction response corresponding to the transaction request, based on the information regarding the payment means, to the RSE.

After the operation of the head unit 200 is joined to the OBU 100 through the CAN circuit part 120, the head unit 200 reads the information regarding the payment means, previously stored in the vehicle payment system, and transmits the information regarding the payment means to the CAN circuit part 120 of the OBU 100.

Meanwhile, according to embodiments of the present disclosure, in at least one of a situation in which the head unit 200 is updated during driving of the vehicle and a situation in which the head unit 200 is malfunctioning, the ETCS circuit part 110 may read the information regarding the payment means stored in the internal memory 150.

That is, when the head unit 200 is normal, the ETCS circuit part 110 may receive the information regarding the payment means, previously set in the vehicle payment system, through the CAN circuit part 120. During passing by the RSE, the ETCS circuit part 110 may transmit the transaction response corresponding to the transaction request, based on the received information regarding the payment means, to the RSE.

In addition, when it is impossible to receive the information regarding the payment means through the CAN circuit part 120 due to the update, malfunctioning, or the like, the ETCS circuit part 110 may read the information regarding the payment means stored in the internal memory 150 and, during passing through the RSE, transmit the transaction response corresponding to the transaction request to the RSE.

As described above, the OBU 100 according to embodiments of the present disclosure pays an electronic card charge using the payment means, and thus is characterized by not being provided with a socket into which the electronic card is to be inserted.

Meanwhile, embodiments of the present disclosure pay a toll by receiving the information regarding the payment means from the vehicle payment system instead of being provided with the electronic card. Here, the information regarding the payment means, previously registered in the vehicle payment system, may be information regarding an electronic card. That is, embodiments of the present disclosure may be configured such that the electronic card, such as a Hi-pass card, may be previously registered in the vehicle payment system on the basis of software.

Thus, not only the payment means but also the electronic card may be registered in the vehicle payment system. At the same time that the vehicle is turned on, the information regarding the electronic card can be received from the vehicle payment system and be stored. When a payment request for a charge is received from the RSE, the OBU 100 may enable the charge to be paid by a process of requesting the information regarding the electronic card from the vehicle payment system through the CAN communication and transmitting the information regarding the electronic card to the RSE.

According to embodiments of the present disclosure as described above, there is an advantage in that a variety of errors, such as an insertion error and a recognition failure error of the electronic card, can be fundamentally removed. It is unnecessary to insert or purchase the electronic card, and it is possible to remove the socket in the OBU 100, thereby reducing costs. In addition, even in the case in which the function or operation is disabled due to load on the CAN communication or the malfunctioning, update, or the like of the head unit 200 during driving, it is advantageously possible to pay an ETCS charge using the payment means registered in the vehicle payment system.

Figure 15:
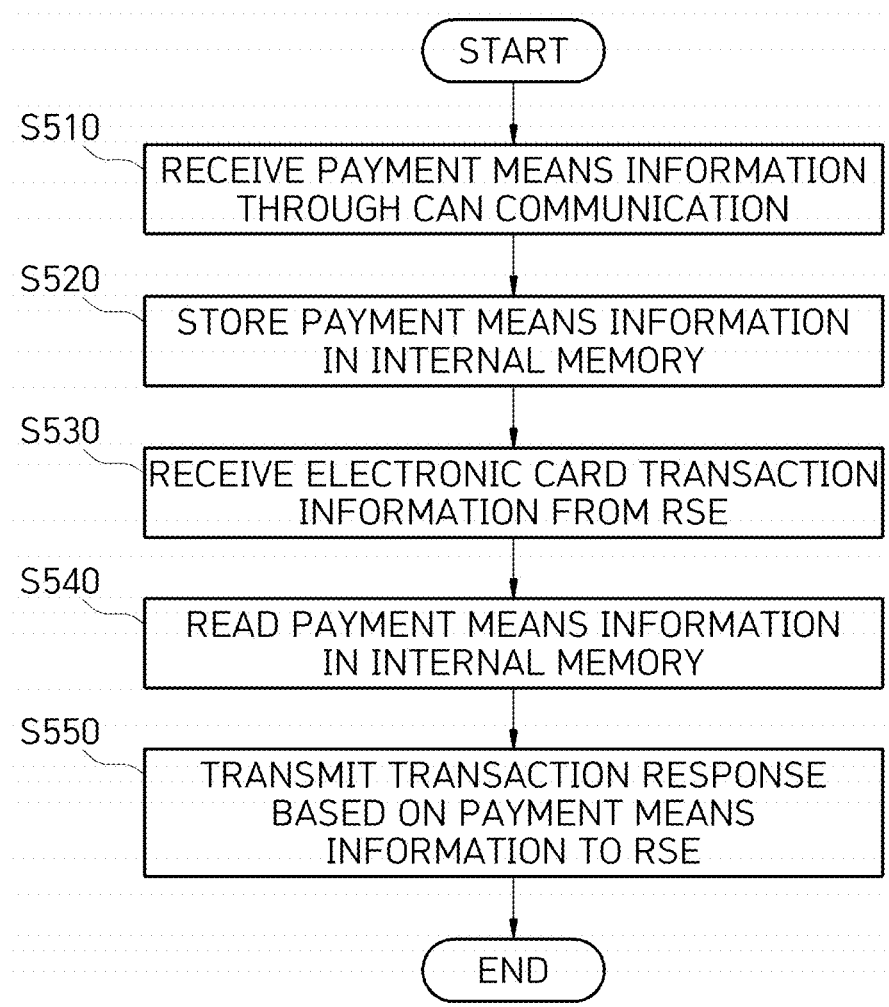
FIG. 15 is a flowchart illustrating method of paying an electronic card charge through CAN communication.

FIG. 15 is a flowchart illustrating method of paying an electronic card charge through CAN communication.

Respective steps illustrated in FIG. 15 may be understood as being performed by the OBU 100 described above with reference to FIG. 14, but are not limited thereto.

Frist, when the vehicle is turned on, the information regarding the payment means, previously set in the vehicle payment system, is received through the CAN communication in S510, and the received information regarding the payment means is stored in the internal memory in S520.

Afterwards, when a transaction request for the electronic card of the OBU 100 is received from the RSE during passing by the RSE in S530, the information regarding the payment means stored in the internal memory is read in S530.

Thereafter, a transaction response corresponding to the transaction request, based on the read information regarding the payment means, is transmitted to the RSE in S550.

In the above description, steps S310 to S550 may be further divided into additional steps or may be provided as a combination of sub-steps according to implementations of the present disclosure. In addition, some steps may be omitted as required, or the order of some steps may be changed. Furthermore, features described with reference to or illustrated in the drawings may be applied to the electronic card charge payment method even in the case that descriptions thereof are omitted.

Table 6 illustrates the test result of communication rates of respective communication methods described above with reference to FIGS. 10 to 15.

TABLE 6

| Comm. Method | Comm. Rate | H/Unit Payment (Card) Processing Time | In-Vehicle Transmission (H/Unit ↔ ETCS) | | ETCS Internal Processing Time | | ETCS ↔ Base Station Transmission (RF Comm.) | Total Expected Time (Ave.) |
|---|---|---|---|---|---|---|---|---|
| | | | CAN | Serial (UART) | CAN-ASIC | Card | | |
| Present (Payment Not Used) | — | — | — | — | — | 65 ms | 100 ms | 165 ms |
| HS CAN | 500 Kbps | 65 ms | 3.74 ms | — | 1.98 ms | — | 100 ms | 170.72 ms |
| CAN FD | 2 Mbps | 65 ms | 1.28 ms | — | 1.98 ms | — | 100 ms | 168.26 ms |
| Serial (UART) | 115,200 bps | 65 ms | — | 8.43 ms | — | — | 100 ms | 173.43 s |

According to the test result, when the OBU 100 performs electronic card charge payment using the vehicle payment system, a processing rate similar to the current processing rate may be obtained, and the vehicle may pass by the RSE at a speed of 180 Km/h.

Hereinafter, an overhead console according to embodiments of the present disclosure will be described with reference to FIGS. 16 to 19.

Figure 16:
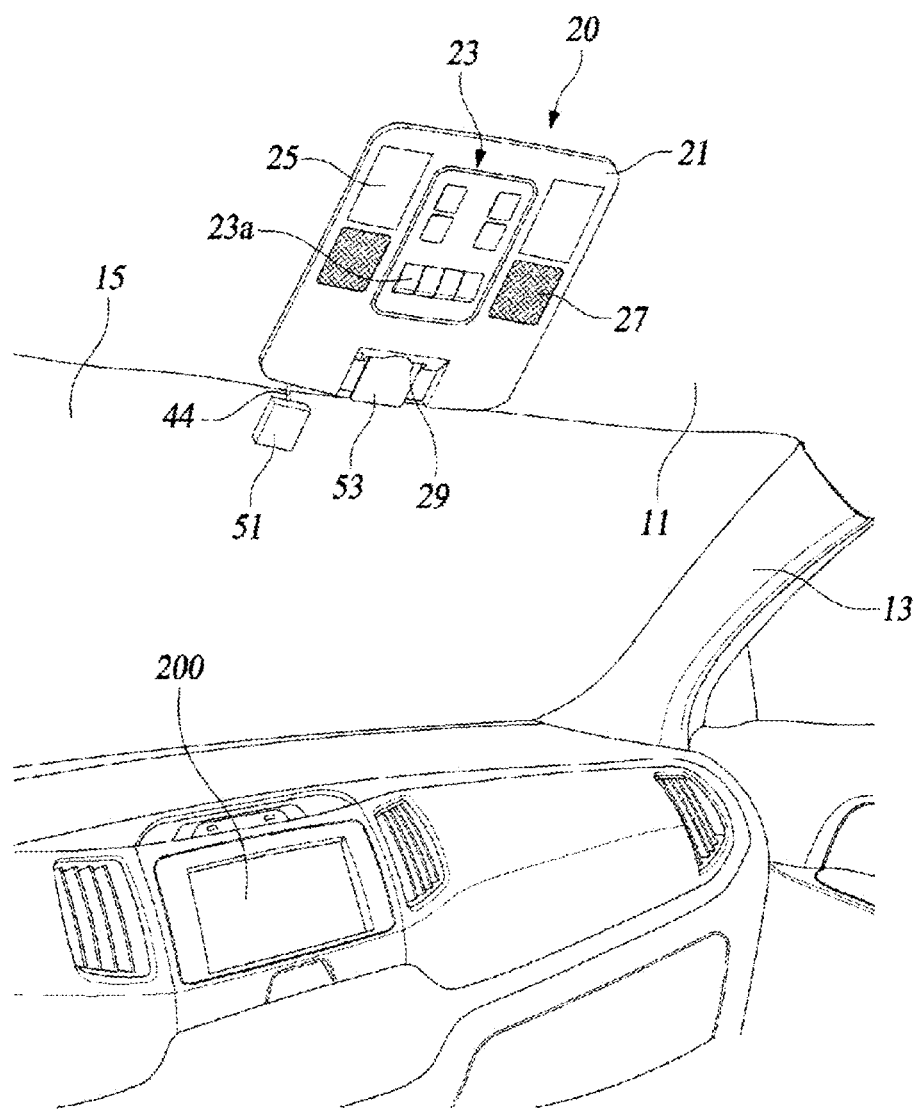
FIG. 16 is a perspective view schematically illustrating the inside of a vehicle provided with an OBU-embedded overhead console.
Figure 17:
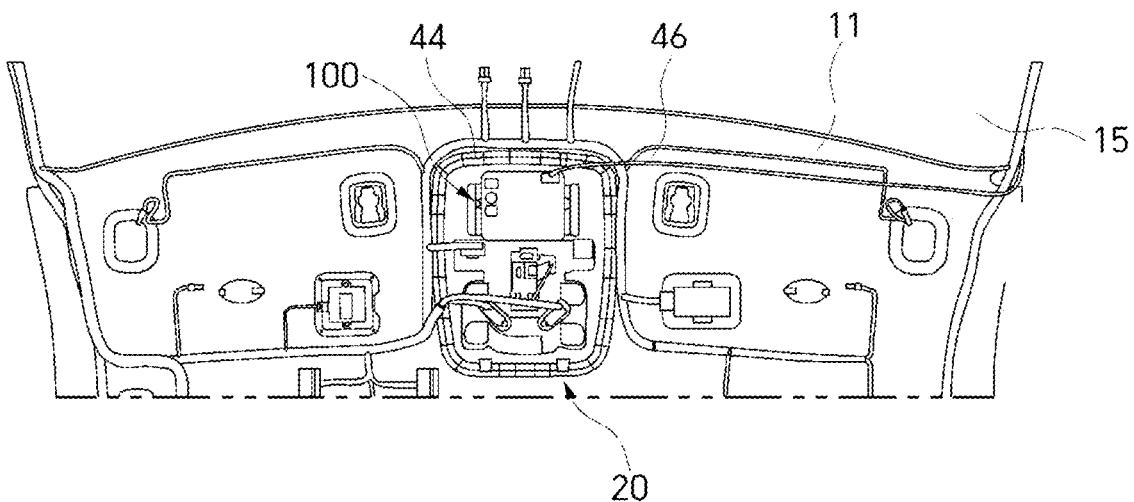
FIGS. 17 and 18 are views illustrating the internal configuration of the overhead console illustrated in FIG. 16.
Figure 18:
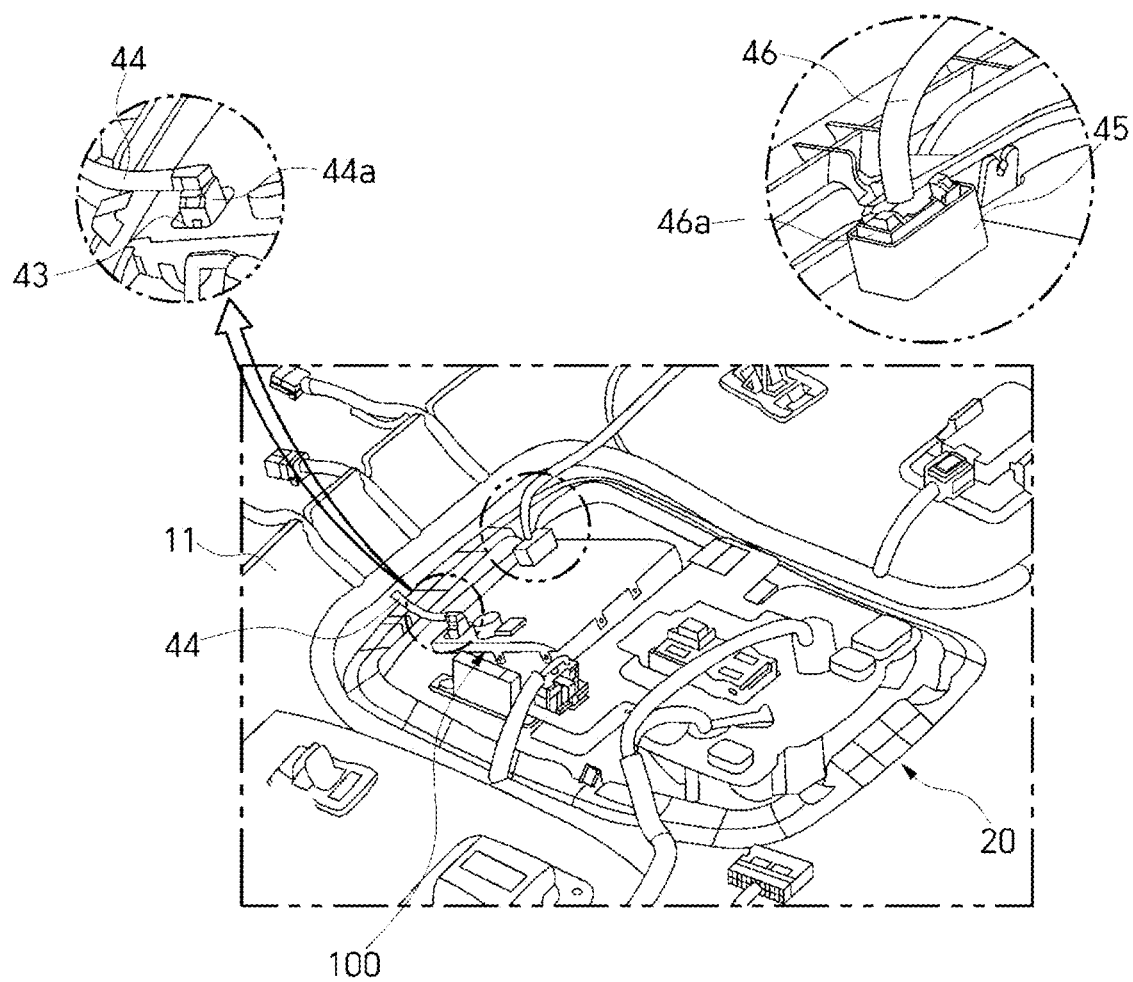
Figure 19:
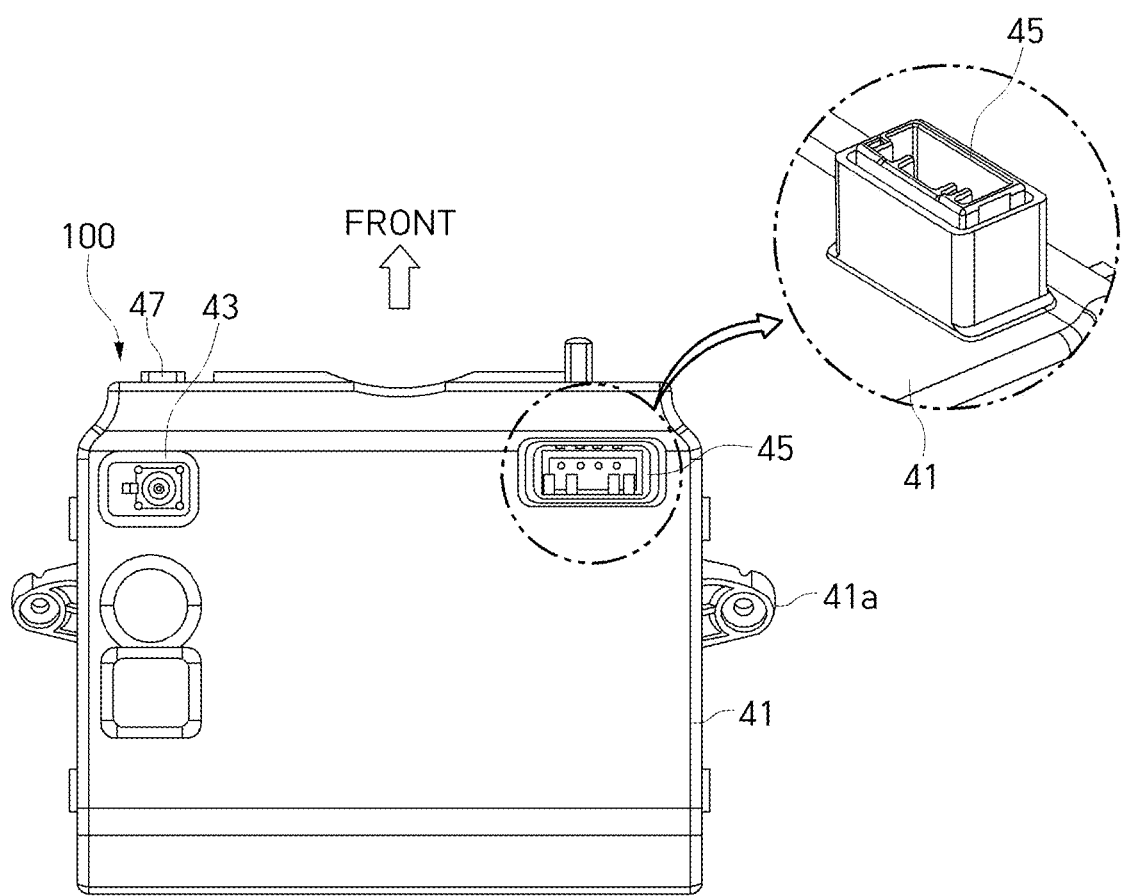
FIG. 19 is a plan view separately illustrating the OBU illustrated in FIG. 17.

FIG. 16 is a perspective view schematically illustrating the inside of a vehicle provided with an OBU-embedded overhead console 20. FIGS. 17 and 18 are views illustrating the internal configuration of the overhead console 20 illustrated in FIG. 16. FIG. 19 is a plan view separately illustrating the OBU illustrated in FIG. 17.

The installation position of the overhead console 20 according to the present embodiment is the same as that of a conventional overhead console. That is, the overhead console 20 is mounted on a head lining 11 on the ceiling of the vehicle so as to be adjacent to a windshield 15.

The overhead console 20 accommodates therein the OBU, i.e., an ETCS module, buttons for operating the ETCS module, and a speaker, which have previously been disposed inside a rearview mirror. Thus, the volume and weight of the rearview mirror may be reduced, thereby significantly improving the design of the rearview mirror.

In addition, an ETCS antenna 51 is disposed in front of the overhead console 20. The ETCS antenna 51 is fixed to the top central portion of the windshield 15 using, for example, a piece of double-sided tape so as to transmit and receive a radio frequency (RF) signal. The ETCS antenna 51 is connected to the OBU 100 through a feeder cable 44.

Meanwhile, the overhead console 20 according to the present embodiment includes a console cover 21, the OBU 100, and speakers 27.

The console cover 21 is a member fixed to the interior ceiling of the vehicle, and accommodates therein the OBU 100, related general components for driving the OBU 100, and the speakers 27. Such interior elements are positioned in a space above the console cover 21, for example, a space between the console cover 21 and a steel plate of the vehicle roof, and are connected to the head unit 200 through a CAN joint cable 46 and the ETCS antenna 51 through the feeder cable 44.

An operating part 23 is disposed on the central portion of the console cover 21. The operating part 23 may include a plurality of operation buttons 23a, such as an ETCS button, a power button, a volume button, and a balance inquiry button, which are to be operated by a user. In addition, lamps 25 and the speakers 27 are disposed on both sides of the operating part 23. Each of the speakers 27 is disposed inside the upper portion of the console cover 21, with a diaphragm thereof being open downward from the console cover 21. In addition, the console cover 21 is further provided with a card slot 29. The card slot 29 is a channel into which an electronic card 53 is inserted. However, when an OBU model that does not use the electronic card 53 is provided, the card slot 29 is also not provided.

The OBU 100 is a type of ETCS device having a function of communicating with the head unit 200. The OBU 100 is a device that serves as a Hi-pass terminal and works in concert with the head unit 200. The OBU 100 may have a variety of internal configurations while being able to perform such functions.

The OBU 100 includes a housing 41, the ETCS circuit part 110 disposed inside the housing 41, the CAN circuit part 120, the power circuit part 130, a feeder cable connector 43, a CAN connector 45, a speaker connector 47, and a main connector (not designated with a reference numeral).

The housing 41 has substantially the shape of a plate, and includes mounting brackets 41a on both sides. Due to the mounting brackets 41a fixed to the console cover 21, the housing 41 is fixed to be inclined downward in the front direction as illustrated in FIG. 18. The housing 41 is inclined downward in the front direction as a configuration allowing the electronic card 53 to be inserted into the card slot 29. The "front" refers to the front with respect to the forward direction of the vehicle.

The speaker connector 47 is a portion into which a terminal of a speaker cable is fitted, and is positioned on the leading end of the housing 41. The speaker cable is disposed inside the console cover 21 to connect the OBU 100 and the speakers 27.

A connector terminal 44a of the feeder cable 44 is fitted into the feeder cable connector 43. The feeder cable 44 is a cable connecting the OBU 100 and the ETCS antenna 51. In particular, as illustrated in FIG. 18, the feeder cable connector 43 is disposed on the top surface of the front end of the housing 41. The feeder cable connector 43 is disposed as far forward as possible in this manner, so that the feeder cable 44 can be withdrawn directly forward (i.e., in the direction of the windshield) so as to be directly connected to the ETCS antenna 51.

The feeder cable 44 is withdrawn forward in order to minimize the interference between cables. As illustrated in FIG. 17 or 18, a plurality of cables are disposed inside the console cover 21. When the feeder cable 44 overlaps or intersects another cable, noise may be produced.

Meanwhile, the CAN connector 45 is a vertical connector, and is disposed on the top surface of the front end of the housing 41 like the feeder cable connector 43. That is, the CAN connector 45 is disposed far forward as possible. A connector terminal 46a of the CAN joint cable 46 is fitted into the CAN connector 45. The CAN joint cable 46 is a cable connecting the CAN circuit part 120 and the head unit 200. As illustrated in FIG. 17, the CAN joint cable 46 extends sideward and passes through inside the head lining 11 and an A pillar so as to be connected to the head unit 200.

The CAN connector 45 is disposed in the front position for the same reason as the feeder cable connector 43 is disposed in the front position. That is, it is intended to minimize the interference between cables and ensure convenience in assembly. When the CAN joint cable 46 overlaps or intersect another cable inside the console cover 21, an error may occur in data due to the inference between cables, thereby causing problems in assembly and quality.

Accordingly, the overhead console 20 having the above-described configuration according to the present embodiment has a structure accommodating the OBU 100, the speakers 27, and other related elements, which have been disposed inside the rearview mirror in the related art. In particular, even in the case that the OBU 100 is disposed inside the overhead console 20, there can be no interference between cables, thereby optimizing an ETCS package and improving the design and functions of the rearview mirror.

Embodiments of the present disclosure as set forth above may be implemented as a program (or an application) and stored in a medium so as to be executed in combination with a computer, i.e., a piece of hardware.

For the computer to read the program and to execute a method implemented using the program, the program may include codes encoded in a computer language, such as C, C++, JAVA, Ruby, or a machine language, which a processor (e.g., a central processing unit (CPU)) of the computer may read through a device interface of the computer. The code may include a functional code related to a function that defines necessary functions executing the method, and the functions may include an execution procedure related control code necessary for the processor of the computer to execute the functions in procedures thereof. Such codes may further include additional information that is necessary for the processor of the computer to execute the functions or a memory reference related code on which location (address) of an internal or external memory of the computer should be referenced by the media. Further, when the processor of the computer is required to perform communication with another computer or a server in a remote site to allow the processor of the computer to execute the functions, the code may further include a communication related code on how the processor of the computer executes communication with another computer or the server or which information or medium should be transmitted and received during communication by using a communication module of the computer.

The stored medium refers not to a medium, such as a register, a cache, or a memory, which stores data for a short time but to a medium that stores data semi-permanently and is read by a device. In detail, for example, the stored medium may include a read only memory (ROM), a random access memory (RAM), a CD-ROM, a magnetic tape, a floppy disk, and an optical data storage device, but the inventive concept is not limited thereto. That is, the program may be stored in various recording media on various servers, which the computer may access, or in various recording media on the computer of the user. Further, the media may be dispersed in a computer system connected to the medium through a network, and codes that may be read by the computer in a dispersion manner may be stored.

The foregoing description of the present disclosure has been provided for illustrative purposes, a person skilled in the art will appreciate that other specific modifications can be easily made without departing from the technical spirit or essential features of the present disclosure. Therefore, the foregoing embodiments shall be interpreted as illustrative, while not being limiting, in all aspects. For example, some components, each of which has been described as being a single form, can be implemented in the distributed form, whereas other components, which have been described as being distributed, can be implemented in a combined form.

The scope of the present disclosure is not defined by the detailed description as set forth above but by the appended Claims. It should also be understood that all changes or modifications derived from the definitions and scopes of the Claims and their equivalents fall within the scope of the present disclosure.

What is claimed is:

1. An on board unit updatable by working in concert with an in-vehicle head unit, the on board unit comprising:
   a controller area network (CAN) circuit part including an electrical CAN connection to a CAN bus of a vehicle, the CAN circuit part transmitting data to, and receiving data from, the head unit as CAN communication via the CAN bus; and
   an electronic toll collection system (ETCS) circuit part electrically connected to the CAN circuit part,
   wherein the CAN circuit part receives update target data from the head unit via the CAN bus,
   wherein a CAN control program of the CAN circuit part and an ETCS control program of the ETCS circuit part are independently updated by:
      the CAN circuit part updating the CAN control program by executing the update target data when the update target data is determined to be intended for the CAN circuit part, and the CAN circuit part sending the update target data to the ETCS circuit part, and the ETCS circuit part updating the ETCS control program by executing the update target data when the update target data is determined to be intended for the CAN circuit part.

2. The on board unit according to claim 1, wherein, when the update target data is received from the head unit, the CAN circuit part transmits a result to the head unit and stores an execution image of the update target data and a backup image of the execution image in an internal memory.

3. The on board unit according to claim 2, wherein the update target data is for updating the CAN control program of the CAN circuit part.

4. The on board unit according to claim 1, wherein, when the update target data is received from the CAN circuit part, the ETCS circuit part transmits a result to the CAN circuit part and stores an execution image of the update target data and a backup image of the execution image in an internal memory.

5. A method of updating an on board unit adapted to work in concert with an in-vehicle head unit, the method comprising:
   receiving, by a controller area network (CAN) circuit part of the on board unit including an electrical CAN connection to a CAN bus of a vehicle and an electrical connection to an electronic toll collection system (ETCS) circuit part of the on board unit, update target data from the head unit based on a CAN communication via the CAN bus;
   executing, by the on board unit, the update target data; and
   independently updating a CAN control program of the CAN circuit part and an ETCS control program of the ETCS circuit part by:

the CAN circuit part updating the CAN control program by executing the update target data when the update target data is determined to be intended for the CAN circuit part, and the CAN circuit part sending the update target data to the ETCS circuit part, and the ETCS circuit part updating the ETCS control program by executing the update target data when the update target data is determined to be intended for the CAN circuit part.

6. The method according to claim 5, wherein receiving the update target data from the head unit based on the CAN communication comprises:

when the update target data is received from the head unit, transmitting, by a CAN circuit part, a result to the head unit; and storing an execution image of the update target data and a backup image of the execution image in an internal memory of the CAN circuit part.

7. The method according to claim 6, wherein the update target data is for updating the CAN control program of the CAN circuit part.

8. The method according to claim 6, further comprising:

when the update target data is received from the CAN circuit part, transmitting, an ETCS circuit part, a result to the CAN circuit part; and storing an execution image of the update target data and a backup image of the execution image in an internal memory of the ETCS circuit part.

9. A vehicle system comprising:

a head unit connected to a controller area network (CAN) bus of a vehicle; and an on board unit including a CAN circuit part including an electrical CAN connection to the CAN bus of the vehicle, and an electronic toll collection system (ETCS) circuit part electrically connected to the CAN circuit part, wherein, when update target data is received by the CAN circuit part from an external server, the CAN circuit part stores the update target data in an internal memory, reads the stored update target data, and independently updates a CAN control program and an ETCS control program by:

the CAN circuit part updating the CAN control program by executing the update target data when the update target data is determined to be intended for the CAN circuit part, and the CAN circuit part sending the update target data to the ETCS circuit part, and the ETCS circuit part updating the ETCS control program by executing the update target data when the update target data is determined to be intended for the CAN circuit part.

10. The vehicle system according to claim 9, wherein, when the update target data is received from the head unit, the on board unit transmits a result to the head unit and stores an execution image of the update target data and a backup image of the execution image in an internal memory.

11. The vehicle system according to claim 10, wherein the update target data is for updating the CAN control program of the on board unit.

12. The vehicle system according to claim 11, wherein, when the update target data is received from the CAN communication part, an ETCS circuit part of the on board unit transmits a result to the CAN communication part and stores an execution image of the update target data and a backup image of the execution image in an internal memory.

* * * * *